(12) United States Patent
Soliman

(10) Patent No.: US 8,040,850 B2
(45) Date of Patent: Oct. 18, 2011

(54) ADVANCED INTERNET PROTOCOL WITH FLASH-OFDM METHODS AND SYSTEMS

(75) Inventor: Hesham Soliman, Endeavour Hills (AU)

(73) Assignee: QUALCOMM Incorporated, San Diego, CA (US)

( * ) Notice: Subject to any disclaimer, the term of this patent is extended or adjusted under 35 U.S.C. 154(b) by 1092 days.

(21) Appl. No.: 11/842,870

(22) Filed: Aug. 21, 2007

(65) Prior Publication Data

US 2008/0043614 A1   Feb. 21, 2008

Related U.S. Application Data

(60) Provisional application No. 60/839,359, filed on Aug. 21, 2006.

(51) Int. Cl.
*H04W 4/00* (2009.01)
(52) U.S. Cl. ......... 370/331; 370/338; 370/349; 370/401
(58) Field of Classification Search .................. 370/328, 370/321, 230, 250, 338, 349, 351, 389, 401
See application file for complete search history.

(56) References Cited

U.S. PATENT DOCUMENTS

| | | | |
|---|---|---|---|
| 2004/0004967 A1* | 1/2004 | Nakatsugawa et al. | 370/400 |
| 2004/0165565 A1* | 8/2004 | Omae et al. | 370/338 |
| 2004/0218573 A1* | 11/2004 | Takahashi et al. | 370/338 |
| 2006/0153136 A1* | 7/2006 | Lee | 370/331 |
| 2006/0211402 A1* | 9/2006 | Hofmann | 455/355 |
| 2007/0008906 A1* | 1/2007 | Han et al. | 370/254 |
| 2007/0037553 A1* | 2/2007 | Patel et al. | 455/410 |
| 2009/0046679 A1* | 2/2009 | Isobe et al. | 370/338 |
| 2009/0135822 A1* | 5/2009 | Hirano et al. | 370/392 |
| 2009/0274090 A1* | 11/2009 | Akhtar et al. | 370/328 |

OTHER PUBLICATIONS

Soliman et al. "RFC 4041—Hierarchical Mobile IPv6 Mobility Management", Aug. 2005. pp. 1-29.*

* cited by examiner

*Primary Examiner* — Jung Park
(74) *Attorney, Agent, or Firm* — Francois Pelaez; Jonathan Velasco

(57) ABSTRACT

In various embodiments, communication apparatuses and methods for providing robust communications are disclosed. For example, an apparatus may establish an air interface in accordance with an orthogonal frequency division multiplex (OFDM) protocol. According to another particular aspect, the apparatus establishes an air interface in accordance with a Fast Low-Latency Access with Seamless Handoff Orthogonal Frequency Division Multiplex (FLASH-OFDM) protocol.

6 Claims, 19 Drawing Sheets

ADVANCED INTERNET PROTOCOL WITH FLASH-OFDM METHODS AND SYSTEMS

This Application claims priority to U.S. Provisional Patent Application No. 60/839,359 entitled "A METHOD AND APPARATUS FOR IPv6 FLASH-OFDM SYSTEM" filed on Aug. 21, 2006. The content of the above-cited application is herein incorporated by reference in its entirety for all purposes.

BACKGROUND

I. Field

This disclosure generally relates to wireless communication. More particularly, this disclosure relates to methods and systems for the design and implementation of Internet Protocol version 6 (IPv6) and Mobile IPv6 in a Fast Low-latency Access with Seamless Handoff-Orthogonal Frequency Division Multiplexing (FLASH-OFDM) system.

II. Background

OFDM is a multi-carrier modulation technique that effectively partitions the overall system bandwidth into multiple orthogonal sub-bands, which are also referred to as tones, sub-carriers, bins, and/or frequency channels. With OFDM, each sub-band is associated with a respective sub-carrier that may be modulated with data.

OFDM is widely used in various wireless communication systems, such as those that implement the well-known IEEE 802.1a and 802.11g standards. IEEE 802.1a and 802.1g generally cover single-input single-output (SISO) operation whereby a transmitting device employs a single antenna for data transmission and a receiving device normally employs a single antenna for data reception.

It may be appreciated, that due to the specific structuring of the addresses and communication schemes detailed above, there is a need in the communication and Internet community for methods and systems which maintain the functionally of these systems within a FLASH-OFDM system. Accordingly, new methods and apparatuses are desirable to efficiently integrate the various protocols within a FLASH-OFDM environment.

SUMMARY

Various aspects and embodiments of the invention are described in further detail below.

In a first series of embodiments, an apparatus operable in wireless communication system includes means for receiving a network access request, means for selecting a mobility anchor point (MAP) within a list of MAP and an user device (UD), and means for requesting a prefix for the UD.

In another series of embodiments, a method used in wireless communication system includes receiving a network access request, selecting a MAP within a list of MAP and an UD, and requesting a prefix for the UD.

In yet another series of embodiments, a machine-readable medium comprising instructions which, when executed by a machine, cause the machine to perform operations including receiving a network access request, selecting a MAP within a list of MAP and an UD, and requesting a prefix for the UD.

In still another series of embodiments, an apparatus operable in a wireless communication system includes a processor, configured to receive a network access request; configured to select a MAP within a list of MAP and an UD; configured to request a prefix for the UD, and a memory coupled to the processor for storing data.

In yet another series of embodiments, a method for orthogonal frequency division multiplex (OFDM) address allocation in a wireless communication system includes establishing an air interface with an external host, establishing network access with the external host, and establishing a Hierarchical Mobile IPv6 (HMIPv6) registration, including at least one care-of-address (CoA).

In yet another series of embodiments, a method for orthogonal frequency division multiplex (OFDM) address allocation in a wireless communication system includes obtaining an air interface access to establish an air interface, initiating an initial exchange of information with an external device over the air interface, acquiring network access, performing an initial exchange of data/messaging information with the external device to obtain DHCPv6 520 services, performing a registration, and initiating an exchange of data/messaging information with a host.

In yet another series of embodiments, a method for orthogonal frequency division multiplex (OFDM) address allocation in a wireless communication system includes obtaining an air interface access to establish an air interface, initiating an initial exchange of information with an external device over the air interface, performing a SAP procedure, performing an initial exchange of data/messaging information with the external device, and performing an exchange of information with a MAP.

In yet another series of embodiments, a method for performing a handover process in an orthogonal frequency division multiplex (OFDM) wireless communication system includes obtaining an air interface access to establish an air interface to a first external device, initiating an information transfer to a second external device, initiating an SAP, exchanging information with the second external device, and obtaining MAP information.

BRIEF DESCRIPTION OF THE DRAWINGS

The features and nature of the present disclosure will become more apparent from the detailed description set forth below when taken in conjunction with the accompanying drawings in which reference characters identify corresponding items.

DETAILED DESCRIPTION

Figure 1:
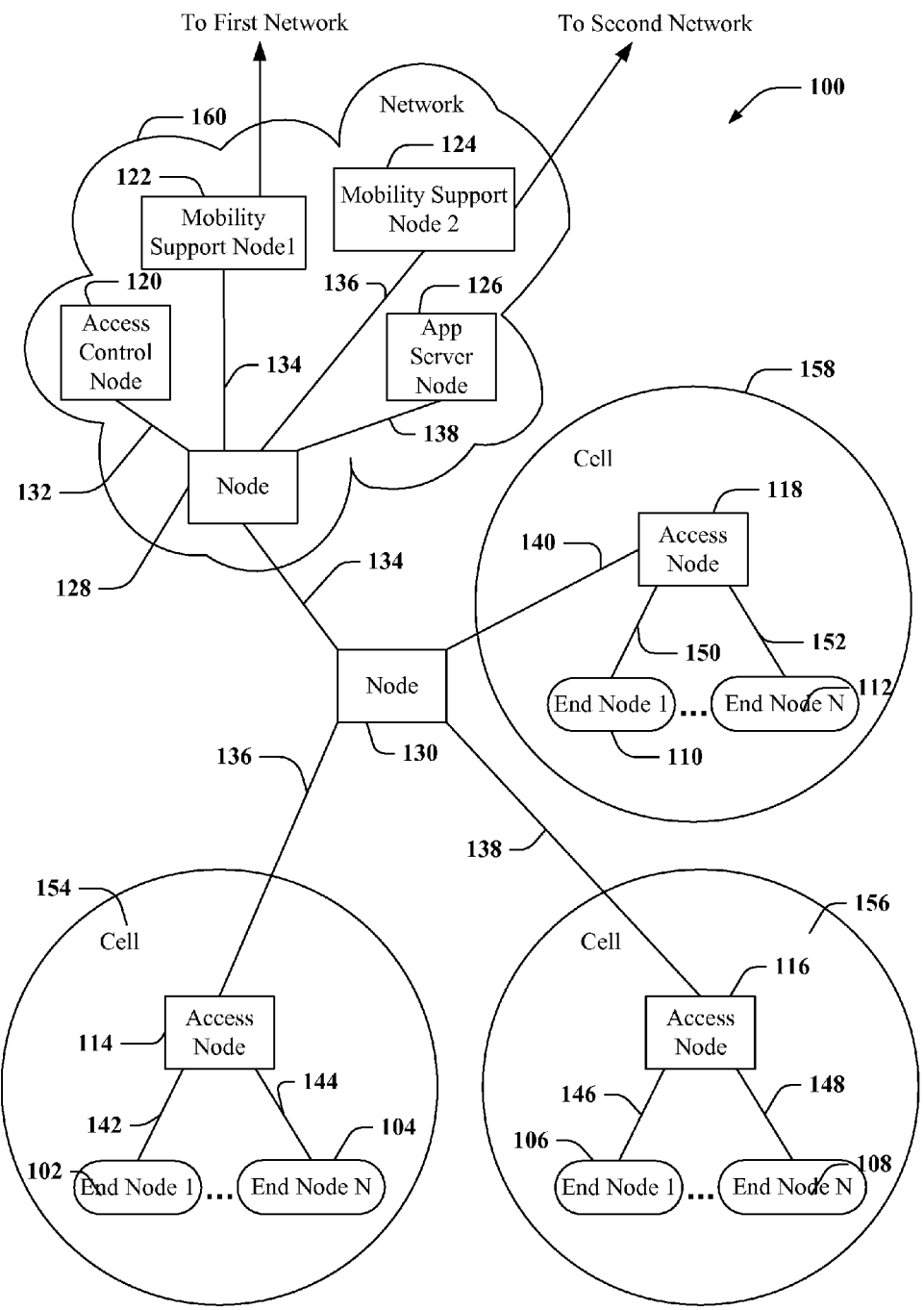
FIG. 1 is a high level block diagram of an example communication system 100 that comprises a plurality of nodes interconnected by communications links.

The disclosed methods and systems below may be described generally, as well as in terms of specific examples and/or specific embodiments. For instances where references are made to detailed examples and/or embodiments, it should be appreciated that any of the underlying principals described are not to be limited to a single embodiment, but may be expanded for use with any of the other methods and systems described herein as will be understood by one of ordinary skill in the art unless otherwise stated specifically.

Wireless communication systems are well known in the art. Generally, such systems comprise communication stations, which transmit and receive wireless communication signals between each other. Depending upon the type of system, communication stations typically are one of two types: base stations (BS) or wireless access terminals (WATs), which include mobile units. The term base station (BS) as used herein includes, but is not limited to, a base station, a Node-B, a site controller, an access point or other interfacing device in a wireless environment that provides WATs with wireless access to a network with which the base station is associated.

Due to the convergence of devices and their functionality, the WAT can include, and is not limited to, a data and/or voice communication device, a user device (UD), a station (STA), a mobile station, a fixed or mobile subscriber unit, a pager, or any other type of device capable of operating in a wireless environment, such as for example, a cellular telephone, a cordless telephone, a Session Initiation Protocol (SIP) phone, a wireless local loop (WLL) station, a PDA, a handheld device having wireless connection capability, a module within a terminal, or other processing device having a wireless communication functionality. Of course, other systems or devices capable of performing as a WAT may be used, according to design or engineering preference, without departing from the spirit and scope of this invention.

Communication implementing the IPv6 protocol may be effected in a FLASH-OFDM system. Generally, WATs and hosts will acquire their addresses in a FLASH-OFDM network to provide mobility management using Mobile IPv6. The implementation of IPv6 is made with co-existence with IPv4 is discussed with deployment in mind.

General Definitions and Terms

For the sake of convenience, terms of art are provided below, further details and explanations being found in Request for Comments (RFC) 4140, the contents of which are incorporated by reference in its entirety.

Access Router (AR)—The AR aggregates the outbound traffic of mobile nodes.

Mobility Anchor Point (MAP)—A MAP is a router located in a network visited by the mobile node. The MAP is used by the Mobile Node (MN) as a local Home Agent (HA). One or more MAPs can exist within a visited network.

Regional Care-of Address (RCoA)—An RCoA is an address obtained by the mobile node from the visited network. An RCoA is an address on the MAP's subnet. It is auto-configured by the mobile node when receiving the MAP option.

HMIPv6-aware Mobile Node—An HMIPv6-aware mobile node is a Hierarchical Mobile IPv6 (HMIPv6) mobile node that can receive and process the MAP option received from its default router. An HMIPv6-aware Mobile Node may also be able to send local binding updates (Binding Update with the M flag set).

On-link/Local Care-of Address (LCoA)—The LCoA is the on-link CoA configured on a mobile node's interface based on the prefix advertised by its default router.

Regional Care-of Address (RCoA)—An RCoA is an address obtained by the mobile node from the visited network. An RCoA is an address on the MAP's subnet. It is auto-configured by the mobile node when receiving the MAP option.

Local Binding Update: The MN sends a Local Binding Update to the MAP in order to establish a binding between the RCoA and LCoA.

Internet Protocol (version 6) (IPv6): a network layer protocol designed to succeed the current Internet Protocol (IPv4) that is widely used throughout the world. IPv6 offers several improvements over IPv4, for example, the use of a 128-bit address that is divided into a prefix (most significant bits) and an interface identifier. In theory those two fields may vary in length. However, it is understood in practice that the prefix advertised to a host is typically 64 bits. These IPv6 addresses can be categorized into several types, including Unicast (identifies one interface on a device) and Multicast: (identifies several interfaces).

Unicast IPv6 addresses can also be categorized by scope into global addresses (the scope of which may include the entire Internet), and (2) Link-local, i.e., addresses that are valid within a link.

Note that, unlike multicast addresses, a packet sent to an anycast address will only be delivered to one interface.

It is understood that there may be two defined mechanisms for allocating addresses in IPv6, including: (1) stateless address autoconfiguration and (2) stateful address autoconfiguration.

In the stateless mechanism a router may advertise a prefix for the link and each host on the link forms a unique interface identifier. Since the prefix is unique, appending a unique interface identifier can guarantee the uniqueness of the address. The interface identifier may therefore only need to be unique within a link since the prefix is globally unique. Address uniqueness can be tested using a Duplicate Address Detection (DAD) mechanism, which can utilize Neighbor Solicitations and Advertisement messages.

Stateful address allocation can be done using Dynamic Host Configuration Protocol for IPv6 (DHCPv6). DHCPv6 is similar to DHCPv4 (for IPv4) with some enhancement. For example, DHCPv6 can allocate an entire address to a host. It can also be use to delegate prefixes to routers. Prefix delegation with DHCPv6 is currently deployed in some fixed broadband markets to allocate prefixes to home routers.

The decision as to use stateful or stateless addressing within a particular deployment may be made by a network administrator whereby router advertisements may inform hosts about the mechanism that may be used on a link.

The following is a cursory discussion on the aspects of On-link Communication between Hosts and Access Routers. IPv6 may be used to define a "Neighbor Discovery" specification used to specify how hosts and routers can communicate on a link. Neighbor Discovery is built on the Internet Control Message Protocol for IPv6 (ICMPv6) protocol whereby each message can be allocated an ICMP type (number are shared with ICMPv4) and may carry several options. The Neighbor Discovery specification includes a number of functions in IPv6 as discussed below:

Router and Link Discovery: This function may allow hosts to discover on-link routers, prefixes and potentially some of the services available on a link, and can be accomplished using Router Solicitations and Router Advertisement messages. Router advertisements include options that inform hosts about on-link prefixes and link (Maximum Transmission Unit) MTU among other options.

Address Resolution: This function is similar to Address Resolution Protocol (ARP) in IPv4 with a significant difference in that it may be performed on the (Internet Protocol) IP layer. This allows it to be secured with IP layer mechanisms. Address resolution mechanisms can use Neighbor Solicitations and Neighbor Advertisements to resolve IP addresses to Media Access Control (MAC) addresses. This is generally needed on links that support MAC addresses.

Neighbor Unreachability Detection (NUD): This function uses the Neighbor Solicitation and Advertisement messages to detect whether a neighbor is reachable. These messages are exchanged between two hosts or a host and a router.

Router Redirects: Redirect messages are sent from routers to hosts to inform the host of a better next-hop for a particular destination. These messages are useful on links with more than one default router or where hosts can communicate directly.

Address Prefixes

DAD avoidance is desired since, if all WATs connected to the BS share the same prefix, DAD messages may have to be relayed through the BS to all other WATs. This has minimal effect on bandwidth utilization, but is understood to have a significant effect on the complexity of the BS implementation and dormancy of other devices. As a design preference, the DAD functionality may optionally reside also in the host implementation.

WATs may be hosts or routers. This guideline enables mini-net or limited-net deployment, particularly in the context of a moving environment, such as, for example, trains, plains, Personal Area Networks (PANs), and similar communication controllers.

Based on the above, hosts, when allocated with prefixes, provide enhanced capabilities, as will become evident herein. Additionally, each BS can also be provided with prefixes to allocate to hosts. It is preferred, but not necessary, that prefixes are substantially stable when the WAT moves from one BS to another. Hence, prefixes allocated to hosts will topologically belong to the MAP function. On the other hand, a dynamic WAT may be allocated an on-link address that changes depending on the BS that it is connected to. The on-link address may be derived from one of the prefixes allocated to the BS and will be allocated by the BS.

Depending on the WAT implementation, the LCoA may or may not be seen by the host. In an integrated WAT implementation, the LCoA may be visible to the host, while in a split WAT-Host implementation, the LCoA may not likely be visible to the host implementation. Table 1, provided below, illustrates the exemplary characteristics of the addresses allocated to the WAT and their various properties.

TABLE 1

Address Allocation to WAT

| Addresses | Properties | | | |
|---|---|---|---|---|
| | Use | Link | Stability | Length |
| Link-local | On-link | All | Infinite | /128 |
| LCoA | Local mobility | BS | Stable within a BS | /64 or /128 |
| RCoA | Application | MAP | Stable within a zone | /64 or longer |

To provide additional context for one or more embodiments described herein, FIG. 1 is provided to illustrate an example communication system 100 that comprises a plurality of nodes 102-128 interconnected by communications links. The system 100 may use Orthogonal Frequency Division Multiplexing (OFDM) signals to communicate information over wireless links. Other types of signals, such as Code Division Multiple Access (CDMA) signals or Time Division Multiple Access (TDMA) signals, are also contemplated (together with signals utilized in land-based networks). Nodes in the exemplary communication system 100 may exchange information using signals, e.g., messages, based on communication protocols, e.g., the Internet Protocol (IP).

The various communications links 134-154 of the system 100 may be implemented, for example, using wires, fiber optic cables, and/or wireless communications techniques.

The nodes 102-128 of the system 100 include a plurality of end nodes 102-112, which may access the communication system 100 by way of a plurality of access nodes 114-118. End nodes 102-112 may be, e.g., wireless communication devices or terminals, and the access nodes 114-118 may be, e.g., wireless access routers or base stations. The communication system 100 may also includes a number of other functional nodes 120-130 that can be used to provide interconnectivity or to provide specific services or functions.

The exemplary communications system 100 is organized such that it includes several networks 154-160. Network 160 includes access control node 120 (which can be a Authentication-Authorization-Accounting, aka AAA, server), a first mobility support node 122, a second mobility support node 124, and application server node 126 (which can be a DNS server, for instance), all of which are connected to an intermediate network node 128 by a corresponding network link 132-138, respectively.

In some embodiments, an access control node may include a Remote Authentication Dial-In User Service (RADIUS) or Diameter server that supports authentication, authorization, and/or accounting of end nodes and/or services associated with end nodes. Additionally, mobility support nodes 122 and 124 may include a Mobile IP home agents and/or context transfer servers that supports mobility/handoff of end nodes between access nodes, e.g., by way of redirection of traffic to/from end nodes and/or transfer of state associated with end nodes between access nodes.

In some embodiments, application server node 126 (which may include a Session Initiation Protocol server, streaming media server, or other application layer server) can support session signaling for services available to end nodes and/or provides services or content available to end nodes. In an example, different end nodes can be associated with different mobility support nodes according to a network to which they belong. For instance, first mobility support node 122 can be associated with a first network while second mobility support node 124 can be connected to a second network. Such networks can be, for instance, MVNOs, VPNs, and/or any combination thereof. As an example, mobility support nodes 122 and 124 can be coupled to network gateway modules (not shown) that enable such nodes to couple to first and second networks, respectively.

Intermediate network node 128 in network 160 provides interconnectivity to network nodes that are external from the perspective of network 160 by way of network link 134. Network link 134 is connected to intermediate network node 130, which provides further connectivity to access nodes 114, 116, and 118 by way of network links 136-140, respectively. Each access node 114-118 is depicted as providing connectivity to end nodes 102-112, respectively, by way of corresponding access links 142-152, respectively. In communication system 100, each access node 114-118 is depicted as using wireless technology, e.g., wireless access links, to provide access. Wired technology may also be utilized, however, in connection with provision of access. A radio coverage area, e.g., communications cells 154-158 of each access node 114-118, is illustrated as a circle surrounding the corresponding access node.

It should be appreciated that communication system 100 can be used as a basis for the description of various embodiments described below. Alternative embodiments include various network topologies, where a number and type of nodes (including network nodes, access nodes, end nodes, as well as various control, support, and server nodes), a number and type of links, and interconnectivity between various nodes may differ from that of communication system 100. Additionally, some of the functional entities depicted in communication system 100 may be omitted or combined. Location or placement of these functional entities may also be varied.

In the exemplary embodiments described herein, it is appreciated that addressing in a FLASH-OFDM system provides a connection-oriented link between a wireless access terminal (WAT) and the BS. As a result, the WAT may only see the BS as its only neighbor. On such links, WATs cannot directly communicate with each other. Therefore, several exemplary optimizations to the addressing and Neighbor Discovery specifications in IPv6 may be devised, based on various implementations of the following exemplary guidelines.

Hosts are allowed to generate temporary addresses at any time as described in RFC 3041, the contents of which are incorporated by reference in its entirety. As a design preference, this function may optionally reside in the Host implementation.

Power-Up Address Allocations

Figure 2:
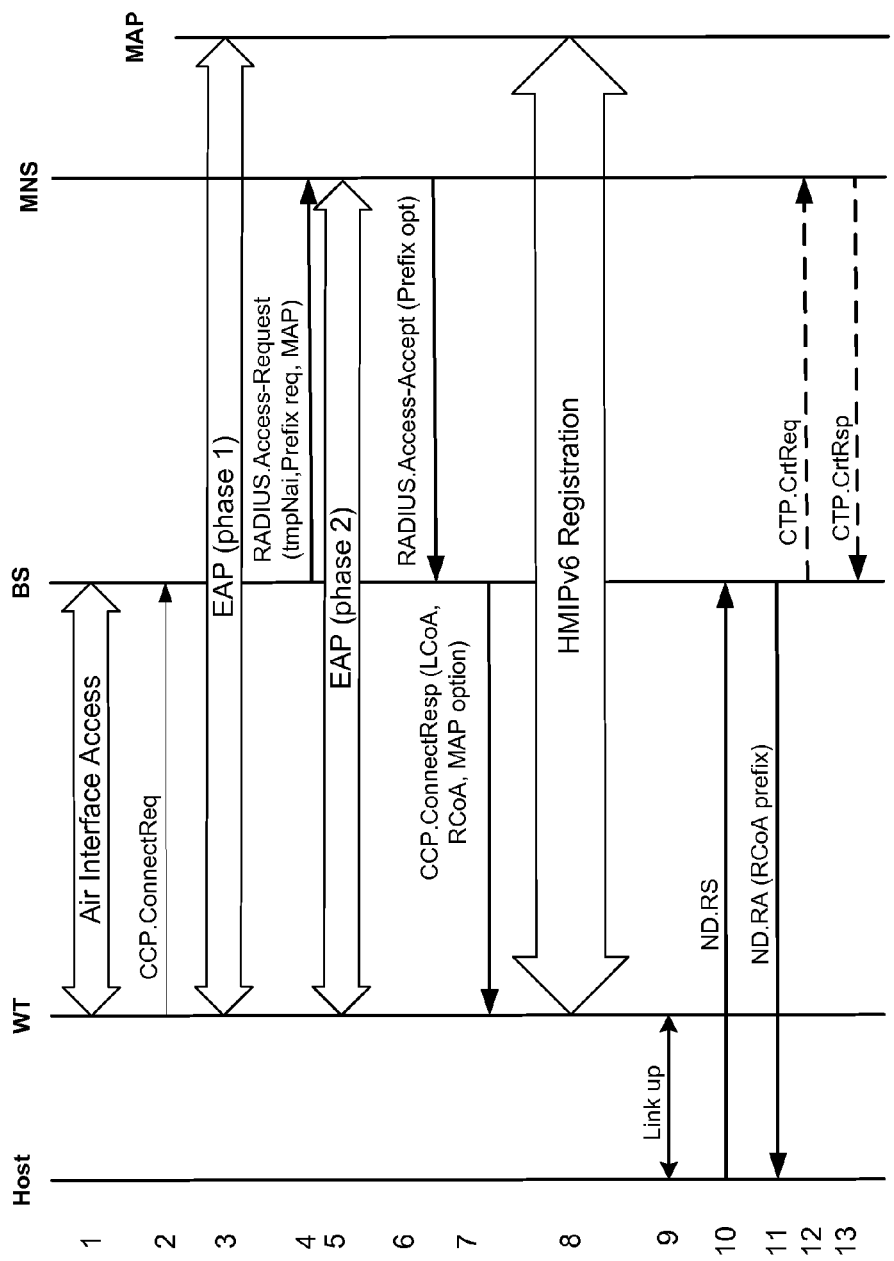
FIG. 2 is a flow diagram illustrating an exemplary Address Allocation process 200 during a power-up scenario, according to an embodiment of this invention.

FIG. 2 is a flow diagram illustrating an exemplary Address Allocation process 200 during a power-up scenario, according to an embodiment of this invention. The exemplary Address Allocation process 200 may be referred to as an AAA-based address allocation, wherein the address allocation is piggybacked on the AAA process. Upon power up of the appropriate systems/devices, the exemplary process 200 commences with the WAT's successful execution of an Air Interface Access procedure with the BS. The WAT may initiate the access procedure with a CCP.ConnectReq message or other appropriately devised initiation message. Following this message, Extensible Authentication Protocol (EAP) mutual authentication takes place using procedures well known in the art.

This exemplary process 200 utilizes at least a two phase EAP authentication, where the first EAP phase authenticates the WAT to the home domain and the second EAP phase authenticates the WAT to the local domain. After the success of the first EAP phase, preferably using a Access-Request RADIUS message, the BS chooses an appropriate MAP from the list of MAPs available in its configuration. The BS initiates the second EAP phase and includes a new Vendor Specific Attributes (VSA) that requests a prefix, which may be optional, responding preferably with an Access-Accept RADIUS message. This message also includes another VSA that contains the address of the MAP selected for the WAT. The MAP's address may be used to allow the Mobile Nodes (MNS) to pick the right prefix pool for a WAT (not shown) that is within or associated with the MNS. The Prefix allocated to the WAT is then returned in the Access-Accept RADIUS message. This message includes the prefix option that will be advertised by the BS.

The lifetime of the prefix allocated in this exemplary embodiment is desired to be the same as the Master Session Key (MSK) lifetime provided by the AAA. This avoids lease renewal requests from the BS to the MNS if the lifetime is less than the MSK lifetime and avoids the address being allocated when the WAT is no longer attached to the system (in event the lifetime is longer than the MSK).

Following a successful second EAP phase, the BS sends the CCP.ConnectResp message including the usual parameters, preferably to the WAT. In addition, the BS includes the LCoA, the MAP option (described in Table 2) and the RCoA in order to allow the MAP registration to be done from the WAT.

Returning to the exemplary process 200 of FIG. 2, after the BS sends the CCP.ConnectResp message and any appropriate additional parameters, the WAT begins execution of its HMIPv6 registration with the MAP. HMIPv6 registrations and the processes associated with it will be separately discussed in further detail below.

After the WAT successfully registers with the MAP, the WAT sends a "link up" indication to the host, which triggers the host to send the Router Solicitation (RS) message to the BS. The BS responds with a Router Advertisement (RA) message including, preferably, the prefix option discussed above for the RCoA prefix allocated to the WAT. Subsequent CTP.CrtReq and Rsp messaging may be optionally initiated between the BS and the MNS as deemed appropriate.

Figure 3:
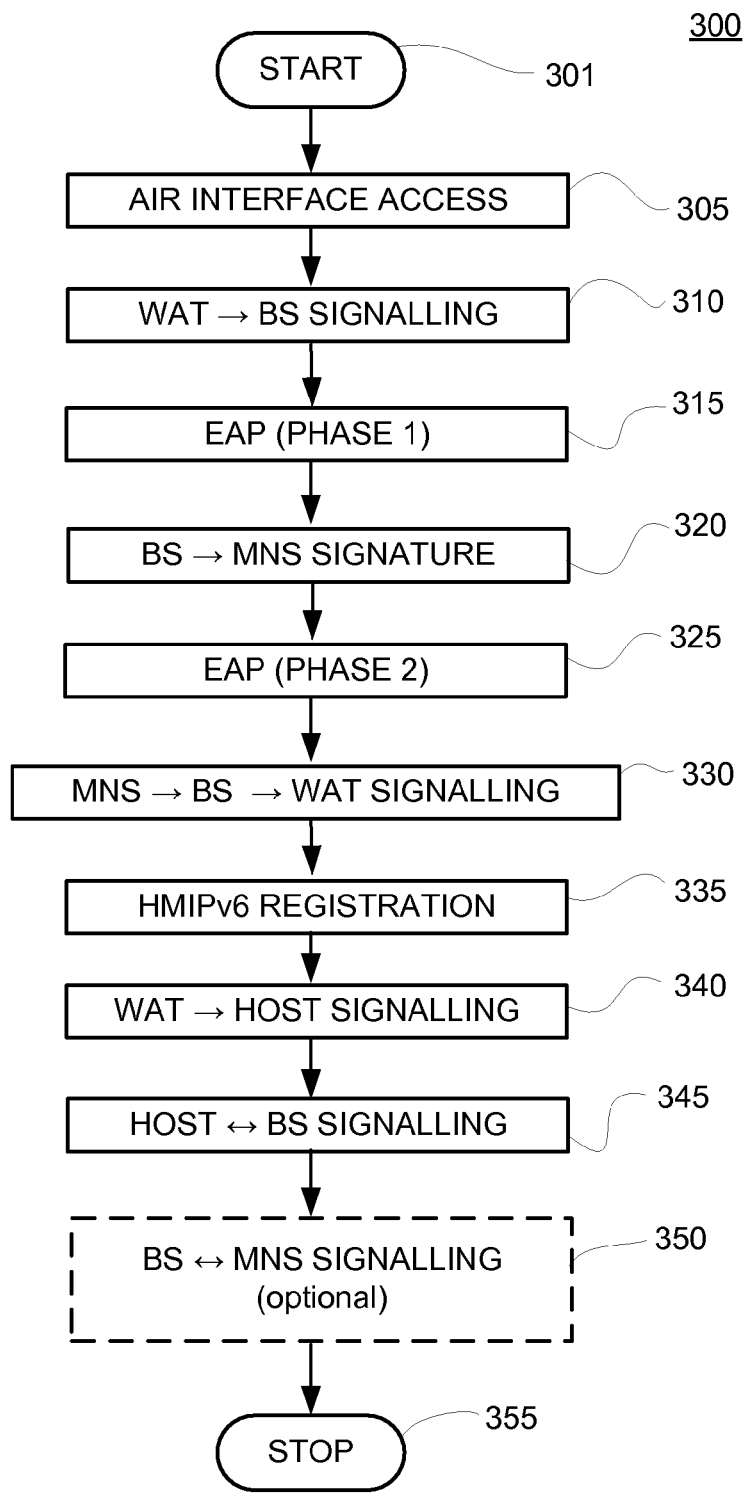
FIG. 3 is a flow chart detailing an exemplary AAA-based process 300 for addressing, according an embodiment of this invention.

FIG. 3 is a flow chart detailing an exemplary AAA-based process 300 for addressing, according an embodiment of this invention. On power-up, the exemplary process 300 begins 301 with an attempt at Air Interface Access 305. With successful completion of Air Interface Access 305, the exemplary process 300 proceeds to initiate the exchange of data/messaging information from the WT to the BS 310. After information has been exchanged, EAP (Phase 1) authentication 315 is begun. Upon completion of this authentication 315, the exemplary process 300 initiates an exchange of data/messaging information from the BS to the MNS 320. Thereafter, EAP (Phase 2) authentication is initiated 325. Upon completion of this authentication 325, the exemplary process 300 proceeds to initiate the exchange of data/messaging information from the MNS to the BS and from the BS to the WT 330. Up completion of this exchange 330, the exemplary process 300 begins HMIPv6 Registration procedures 335. Upon completion of registration 335, the exemplary process proceeds with WT to Host data/messaging information exchange 340. Next, exchange of data/messaging information from the host to the BS 345 is initiated. After completion of this exchange 345, the exemplary process 300 may optionally exchange data/messages between the BS and the MNS 350. After this optional exchange 350, the exemplary process 300 stops 355. If the optional exchange 350 is not invoked, the exemplary process 300 proceeds from the previous exchange 345 directly to termination 355.

Table 2 presented below is an outline of a MAP option suitable for the implementation with the exemplary Address Allocation processes of FIG. 2 and FIG. 3. The outline shown in Table 2 details the allocation of the bits and designations and is provided to demonstrate one possibility for bit designation and ordering. Table 2 is presumed to be self-explanatory, therefore, a detailed description is not provided. It should be appreciated that while Table 2 provides an outline of a MAP option suitable for implementation with the exemplary Address Allocation processes of FIG. 2 or FIG. 3, other MAP options may be devised according to design preference, without departing from the spirit and scope of this invention.

TABLE 2

| 0 | | | | | 1 | | | | | | 2 | | | | | 3 | | |
|---|---|---|---|---|---|---|---|---|---|---|---|---|---|---|---|---|---|---|
| 0 | 1 2 3 4 5 6 7 | 8 9 | 0 | 1 2 3 4 5 | 6 7 8 9 | 0 | 1 2 3 | 4 | 5 6 7 8 9 | 0 | 1 |
| | Type | | | Length | Dist | | Pref | R | Reserved | | |
| | | | | | Valid Lifetime | | | | | | |
| | | | | | Global IP Address for MAP | | | | | | |

Address Allocation

Figure 4:
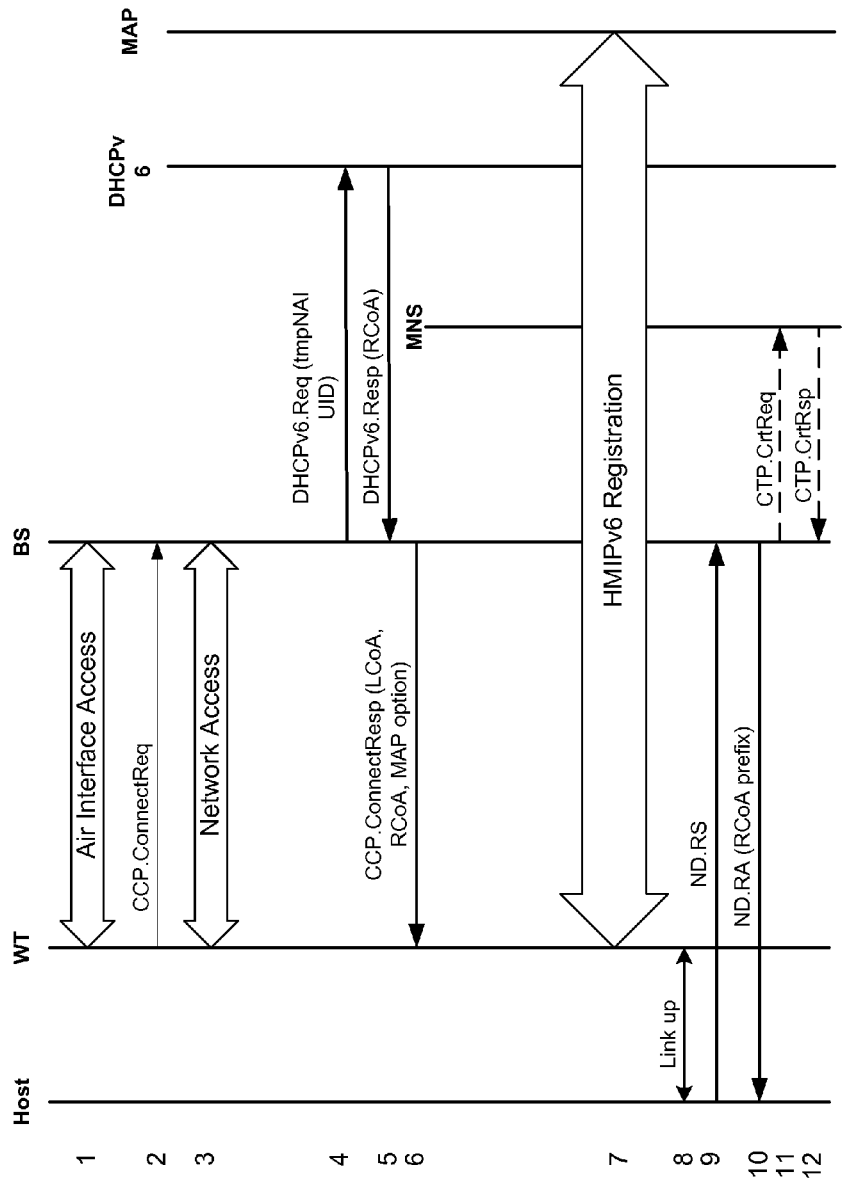
FIG. 4 is a flow diagram illustrating an exemplary Address Allocation process 400 during a power-up scenario, according to another embodiment of this invention.

FIG. 4 is a flow diagram illustrating an exemplary Address Allocation process 400 during a power-up scenario, according to another embodiment of this invention. The exemplary Address Allocation process 400 may be referred to as a Dynamic Host Configuration Protocol version 6 (DHCPv6) based address allocation.

Upon power up of the appropriate systems/devices, the exemplary Address Allocation process 400 proceeds upon the WAT successful execution of an air interface access procedure with the BS. The WAT commences to initiate the network access procedure with a CCP.ConnectReq message or other appropriately devised initiation message. Following this message, mutual authentication takes place using any one of the authentication procedures described in FIG. 2 or FIG. 3, or using procedures well known in the art, such as, for example EAP authentication. If mutual authentication is successful, the BS selects an appropriate MAP for the WAT (not shown). The BS selects the MAP based on a configured list of MAPs within its zone. Following this selection, the BS sends a request for a prefix to be allocated to the WAT. The request is generated by the BS's DHCPv6 client (not shown) on behalf of the WAT. The request is addressed to the DHCPv6 server which is either collocated with the MAP or located in a central node (not shown) in the core network (also not shown).

If the DHCPv6 server is not collocated with the MAP, the request may be relayed to other DHCPv6 servers (not shown) as deemed appropriate. For example, in one such scenario, a particular DHCPv6 server may be needed to allocate prefixes from a specific pool; where such a server may be in the same domain or in a different domain. This scenario applies to cases where the prefix allocated to the WAT belongs to a different administrative domain. This is typically the case when the WAT traffic needs to traverse another domain before being sent on the Internet. Examples where this scenario becomes relevant include wholesale/retail scenarios and roaming scenarios where the home operator wants to ensure that traffic to its devices traverses the home network.

Continuing with the exemplary Address Allocation process 400, the request for prefix results in the identification of the WAT as the original requesting router. This can be done using the DHCPv6's Unique Identifier (DUID) field and setting it to the WAT's temporary NAI (tmpNAI).

Future requests done from the same BS or other BS should use same DUID (tmpNAI) in order to ensure that the DHCPv6 server has a consistent view of the end node. Upon receiving the response from the DHCPv6 server, the BS picks an appropriate LCoA to allocate to the WAT. The LCoA may be a /64 prefix or a /128 IPv6 address. Both the LCoA and RCoA (prefix) are then sent to the WAT in a CCP.Resp message. In addition, the MAP option, as discussed above, may be included to provide the WAT with the MAP's IP address.

Following a successful MAP registration, depicted in FIG. 4 as HMIPv6 Registration, the WAT sends a "link up" message to the host, which triggers the host to send a RS message to the BS. The BS responds with a RA message that includes a prefix option for the RCoA. Subsequent CTP. CrtReq and Rsp messaging may be optionally initiated between the BS and the MNS as deemed appropriate.

Figure 5:
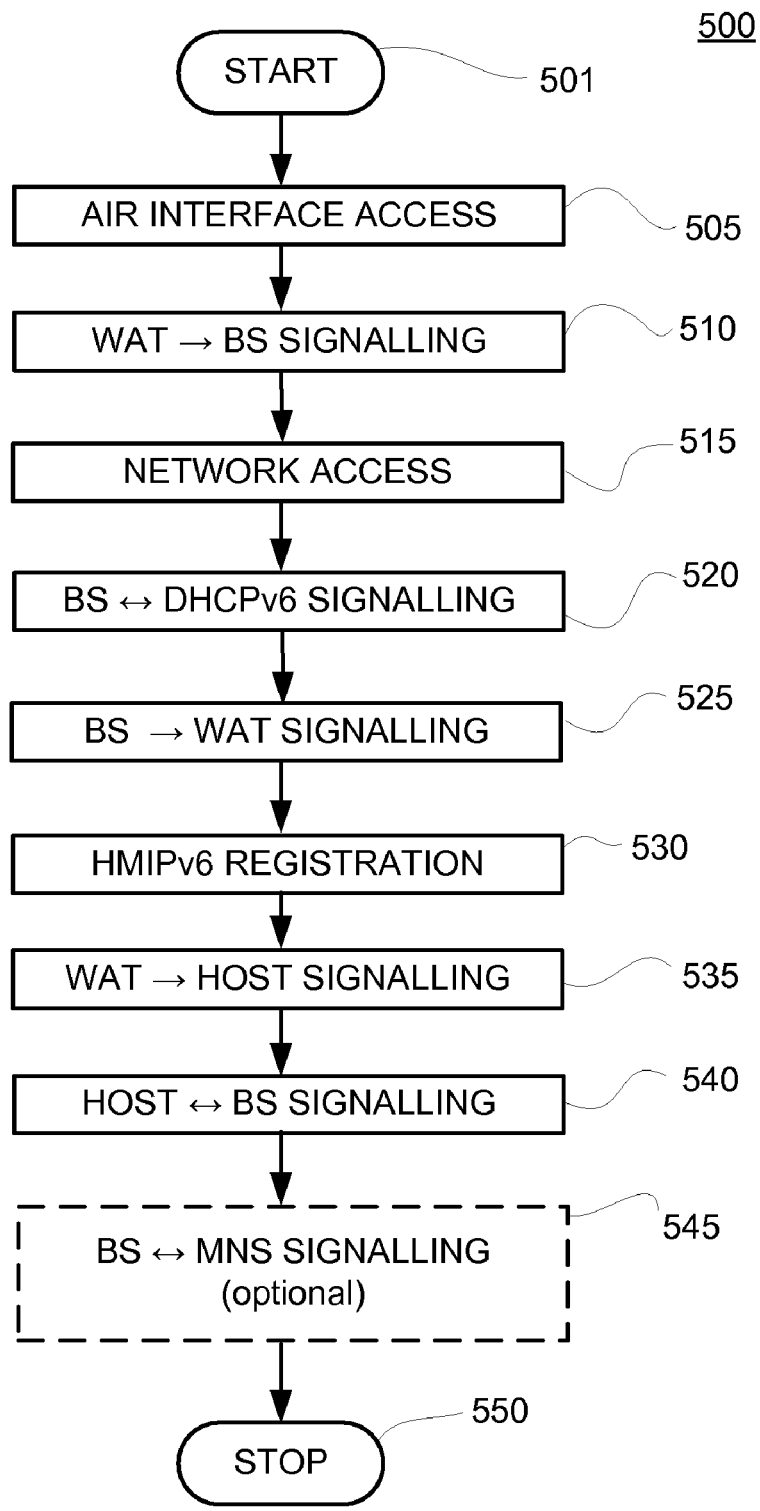
FIG. 5 is a flow chart detailing an exemplary DHCPv6-based addressing process 500, according to an embodiment of this invention.

FIG. 5 is a flow chart detailing an exemplary DHCPv6-based addressing process 500, according to an embodiment of this invention. The exemplary process 500 begins upon power-up at starting point 501. After initial power-up, Air Interface Access 505 is attempted. After successful Air Interface Access 505, the exemplary process proceeds to initiate exchange of data/messaging information from the WT to the BS 510. After receipt of this information, Network Access 515 is attempted. Subsequent to Network Access 515, the exemplary process 500 proceeds to initiate exchange of data/messaging information between the BS and DHCPv6 520 server. Subsequent to this exchange 520, the exemplary process 500 initiates an exchange of data/messaging information from the BS to the WT 525. Next, HMIPv6 Registration is attempted 530. After HMIPv6 Registration 530, initiation of an exchange of data/messaging information from the WT to the host is performed 535. After this exchange 535, Host to BS data/information exchange 540 is performed. Next, after this exchange 540, an optional BS to MNS data/information exchange 545 may be performed. After this optional exchange 545, the exemplary process 500 terminates 550. Of course, if the optional exchange 545 is not invoked, the exemplary process 500 proceeds from the previous exchange 540 directly to termination 550.

It should be noted that implementation of the above exemplary processes will result in impacting existing protocols, necessitating in some instances, adjustments to the protocol defaults or values. For example, with respect to Neighborhood Discovery Protocol (ND) considerations, the RA message should include information about the BS and the link between the BS and the WAT. Within this message, the M flag may be cleared to indicate that stateless address autoconfiguration is used. The O flag may be set to indicate that DHCPv6 may be used for other configuration parameters (e.g., Domain Name Server (DNS) information)). The Router lifetime and Reachable time fields may be set to the maximum possible values to minimize the amount of ND messages sent between the host and the BS.

Additionally, the prefix option for the RCoA prefix may be included in the RA message. Within the prefix option, the L flag should not be set and the A flag may be set. The prefix length is preferably set to 64. The Valid lifetime and preferred lifetime fields may be set to an appropriate value according to the network administrator's discretion; however, these fields should not exceed the lifetime of the MSK.

Other possible options for inclusion in the RA are the link layer and the MTU. The link layer option may be needed for Ethernet emulation purposes. The MTU option presents the link MTU. If this option is not present, the host is presumed to take on a value of "1280".

Additionally, since DAD is typically used by hosts to test an address on their link; and since an entire prefix is allocated to the host in both of the exemplary processes above, DAD is not needed. Despite this, the host may not be aware of that fact (for example, in cases where the WAT and the host are split), and so it may send DAD messages, as needed. DAD messages can then either get filtered in the WAT, or simply discarded in the BS, if so desired.

Other considerations with respect to impacts on protocols would be, for example, in situations concerning Context Transfer (CT). As an illustration, in addition to the current CT information, the following parameters may be found necessary to be transferred to enable proper operation:

The MAP option advertised to the WAT
The prefix option with its current values
If these exemplary process are used, DHCP state is related to prefix delegation
The link-local address of the original BS Further, with respect to impact on Compression Control Protocol (CCP), the CCP.ConnectResp message may be modified to include the following parameters:

The MAP option
The RCoA prefix
The LCoA

With respect to the impact on AAA, the above exemplary processes should have at least three new RADIUS VSAs, or Diameter Attribute Value Pairs (AVPs). Accordingly, the Access-Request message may require the following VSAs:

Prefix-request
MAP-id

While the Access-Accept message may require the following VSA:

RCoA-Pref

Mobility Management

Upon successful Address Allocation, appropriate handshaking and management of mobile devices with the network or connection environment is desired to enable contiguous communication between devices moving or transitioning with the network. In the various exemplary embodiments disclosed herein, schemes for mobility management are presented. For example, a modified or extended HMIPv6 (RFC 4140) solution is utilized where a local MAP is allocated to the WAT. Based on typical HMIPv6 procedures, a WAT would bind its RCoA, which topologically belongs to a MAP's subnet, to the LCoA, which is derived from a prefix that belongs to the BS's link; therefore, whenever the WAT moves to another BS it should get a new LCoA. It is noted here that the RCoA is typically an entire prefix allocated to the WAT and not a single address.

In a FLASH-OFDM based system, the RCoA is used as a stable address by applications running on the host. On the other hand, the LCoA may not be visible to applications or to the host implementation. Since the RCoA is bound to the LCoA and the LCoA changes when the WAT moves to another BS, the WAT would update the MAP with a Local Binding Update (LBU) whenever it changes BS.

Following a successful binding between the RCoA and the LCoA, all packets destined to any address derived from the RCoA would be intercepted by the MAP and encapsulated to the WAT's LCoA. Upon receiving those packets, the WAT (in a split WAT) would remove the outer header from the packet and pass the original packet to the host implementation. Conversely, uplink packets from the WAT are encapsulated in the WAT (in a split WAT) and sent to the MAP. The source address in the outer header of an uplink packet is the LCoA and the destination address is the MAP's address. Further optimizations can be done to compress this outer header or add it (in the uplink scenario) in the BS to save airlink resources.

Since HMIPv6 does not involve the default router in the handover process, some extensions to the specification would be needed in order to allow the use of HMIPv6 in a FLASH-OFDM system. HMIPv6 extensions are needed in order to alert the BS that a handover is taking place and trigger the necessary actions during handover; the action needed will depend on the type of handover which will now be described in further detail below.

Handoff

Figure 6:
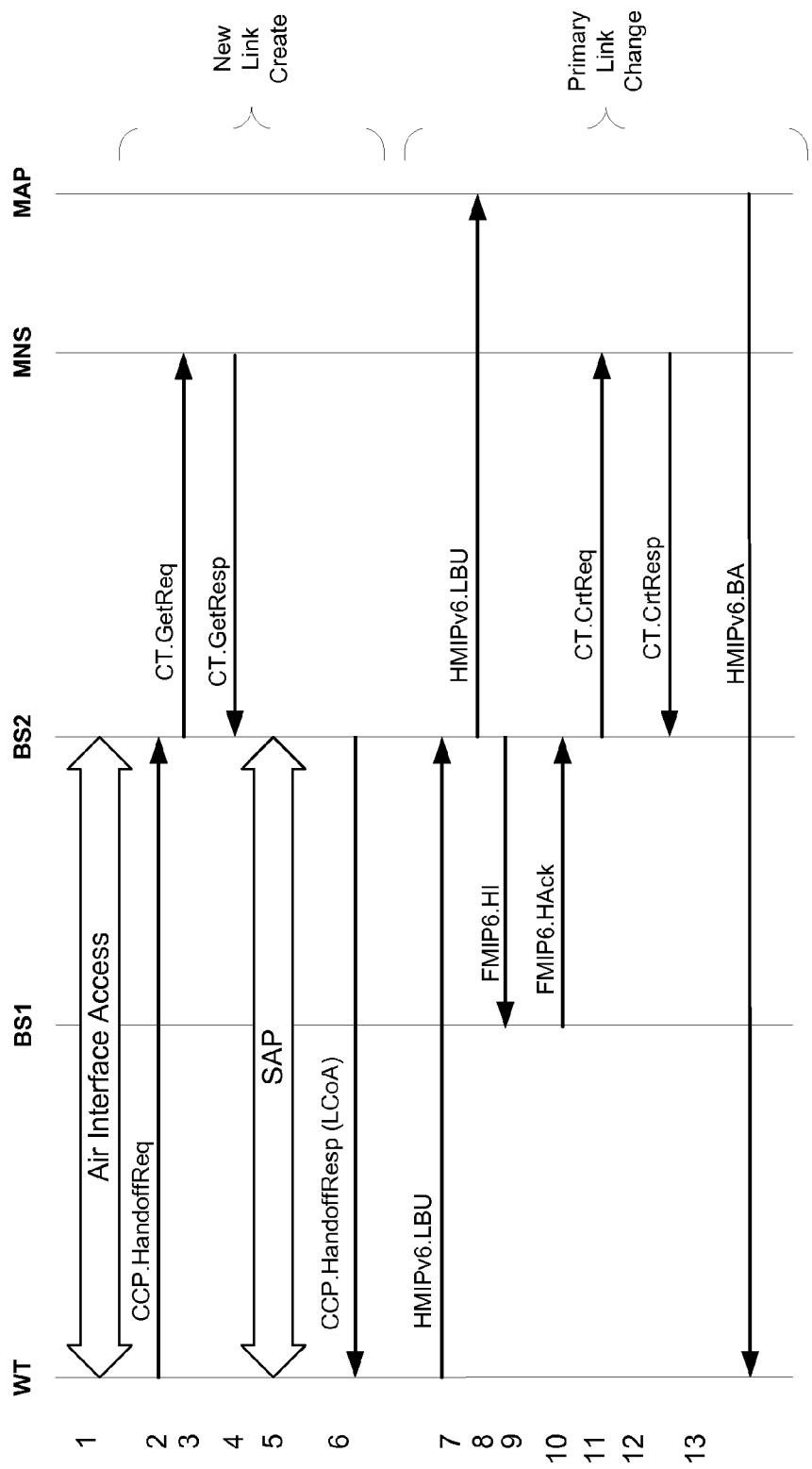
FIG. 6 is an illustration of an exemplary message flow process 600 for a Break-Before-Make (BBM) handover, according to an embodiment of this invention.

FIG. 6 is an illustration of an exemplary message flow process 600 for a Break-Before-Make (BBM) handover. The Air Interface Access, CCP.HandoffReq message, CT.GetReq message, GT.GetResp message, and SAP may be executed according to procedures consistent with a HMIPv4 as implemented in FLASH-OFDM, and thus are not discussed in further detail. A possible extension to the handover request is to include an IPv6 identifier in the message(s) to allow for cases where the access infrastructure is numbered using IPv6 only. Such an extension would add 12 bytes to the message due to the larger IPv6 address space.

The CCP.HandoffResp message should include the WAT's new LCoA. This is desired in order to allow the WAT to perform HMIPv6 registration. In accordance with the exemplary flow process 600, the WAT, in order to initiate handover, would send a HMIPv6.LBU message, addressed to BS2 and the MAP by using an IPv6 routing header. The message received at BS2 would contain the new Handover Alert (HAA) destination option that includes the WAT's previous LCoA, which is used by BS2 to identify BS1's IP address. After copying this information and updating the routing header, BS2 forwards the LBU message to its ultimate destination, the MAP. BS2 530 then sends the FMIP6.HI message to setup a tunnel with BS1. FMIPv6 expects this message to be always sent from the previous BS to the new one. In this scenario, the message is needed in the opposite direction. After processing the HI message, BS1 520 sets up a tunnel to BS2 and responds with the HAck message. From this point onwards, all the WAT's traffic arriving at BS1 is tunneled to BS2. Consequently, the CT.CrtReq and CT.CrtResp messages can be relayed as in a usual manner of which the new IPv6-specific information is now contained in the WAT's context.

Finally, irrespective of the CT messages, the MAP responds to the LBU message with the BA message, which is sent directly to the LCoA to acknowledge the new binding between RCoA and LCoA. From this point onwards all packets addressed to the RCoA are tunneled to the new LCoA. It should be noted that the BA message is shown in FIG. 6 as the last step for illustrative purposes only, and has no dependency on the HI/HAck exchange or the CT messages.

Figure 7:
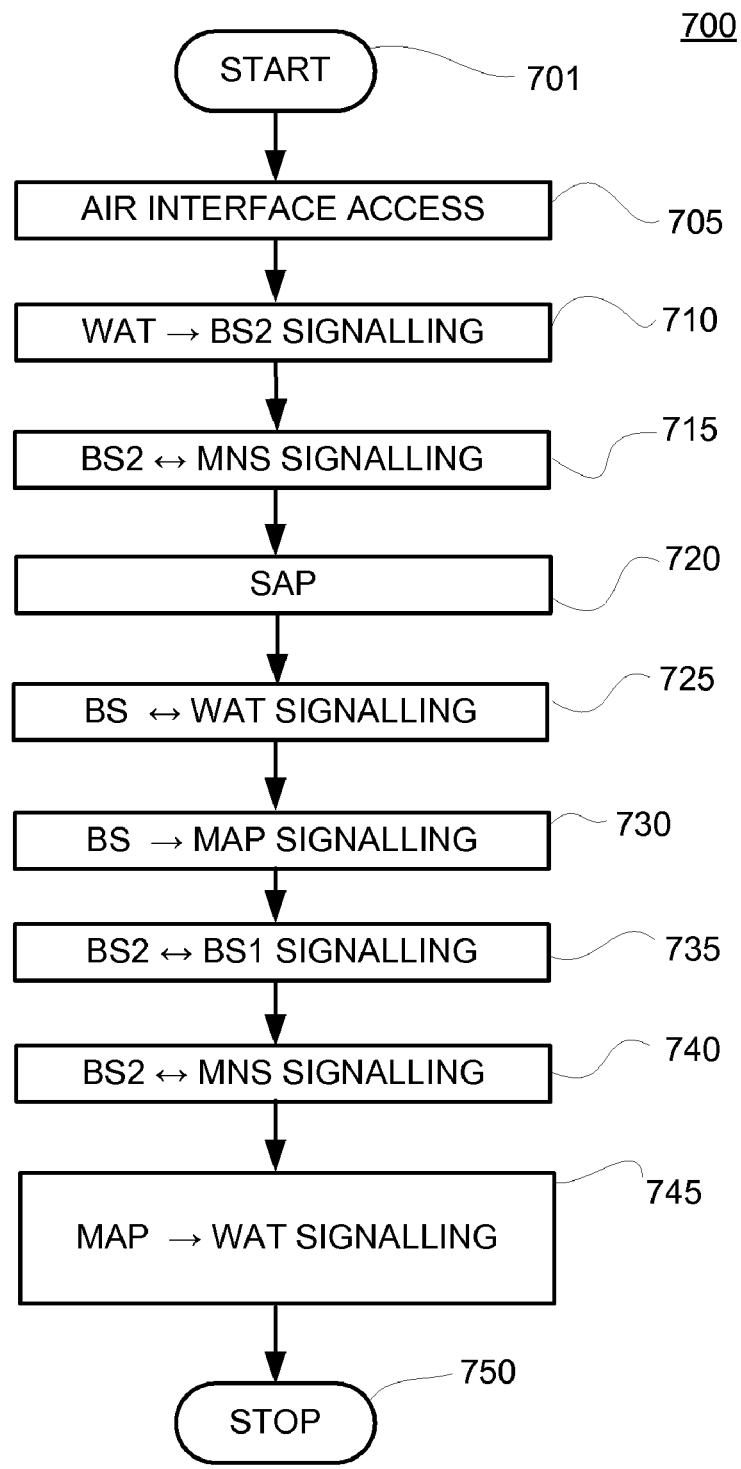
FIG. 7 is a flow chart illustrating an exemplary BBM process 700, according to an embodiment of the invention.

FIG. 7 is a flow chart illustrating an exemplary BBM process 700, according to an embodiment of the invention. The exemplary process 700, from initiation 701 proceeds to at attempt Air Interface Access 705. After successful Access, the exemplary process 700 initiates exchange of data/messaging information from the WT to BS2 710. Next, BS2 to MNS and MNS to BS2 data/messaging information is exchanged 715. Thereafter, the exemplary process 700 initiates SAP 720. After successful SAP completion 720, initiation of an exchange of data/messaging information is performed between BS2 and WT 725. Next, the BS2 transfers data/messaging information to the MAP 730. Next, the exemplary process 700 initiates BS2 to BS1 and BS1 to BS2 data/messaging information exchange 735. After completion of the above exchange 735, BS2 to MNS and MNS to BS2 data/messaging information is exchanged 740. Next, the exemplary process 700 transfers data/messaging information from the MAP to the WT 745. After this transfer 745, the exemplary process 700 terminates 750.

Figure 8:
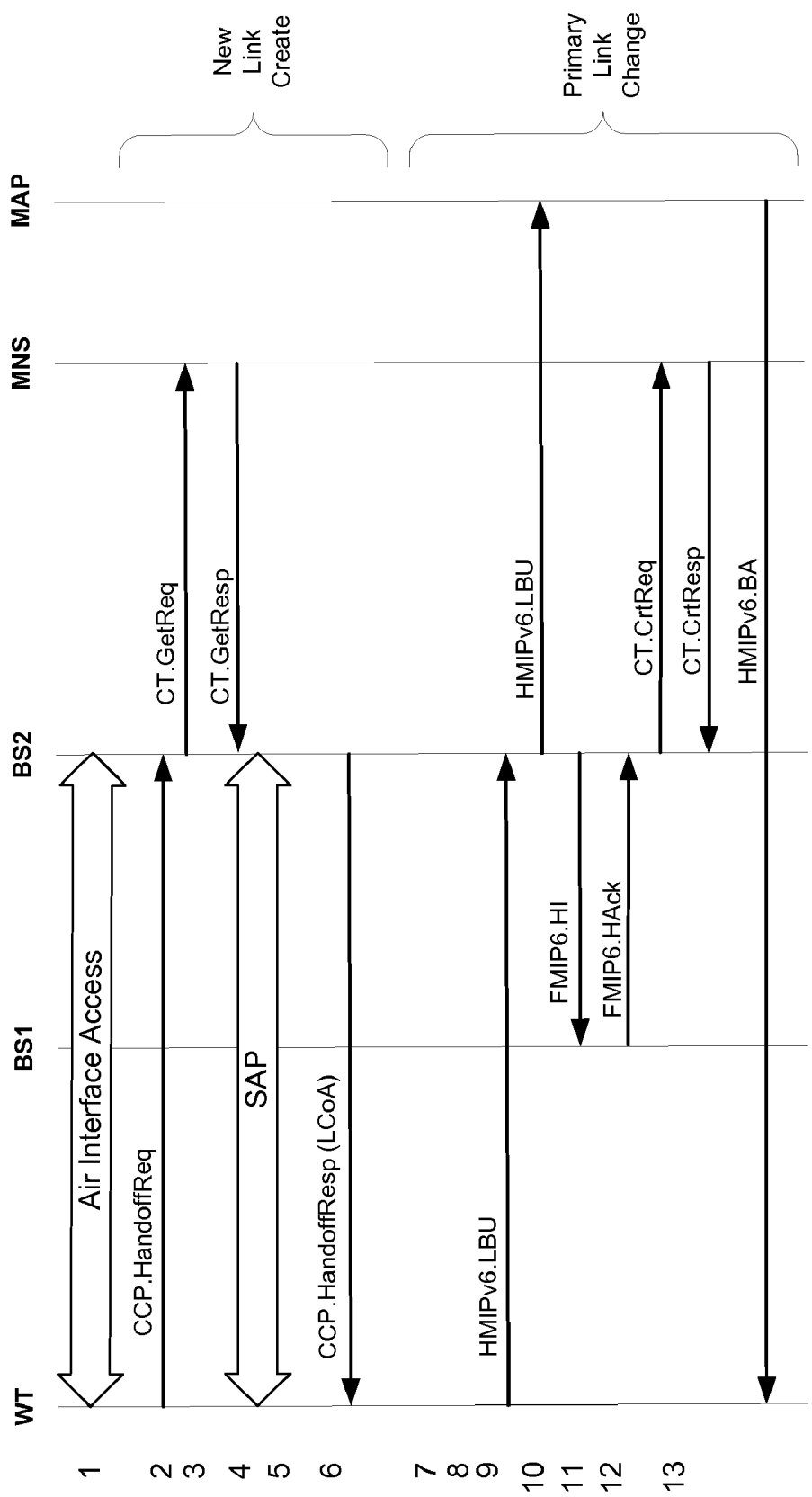
FIG. 8 is an illustration of an exemplary message flow process 800 for a Break-Before-Make (BBM) handover, according to this invention.

FIG. 8 is an illustration of an exemplary message flow process 800 for a Break-Before-Make (BBM) handover. The exemplary message flows for this scenario are substantially identical to those of the BBM handover case, as described above, with the primary exception that the WAT is connected to both BS1 and BS2 during the handover.

Figure 9:
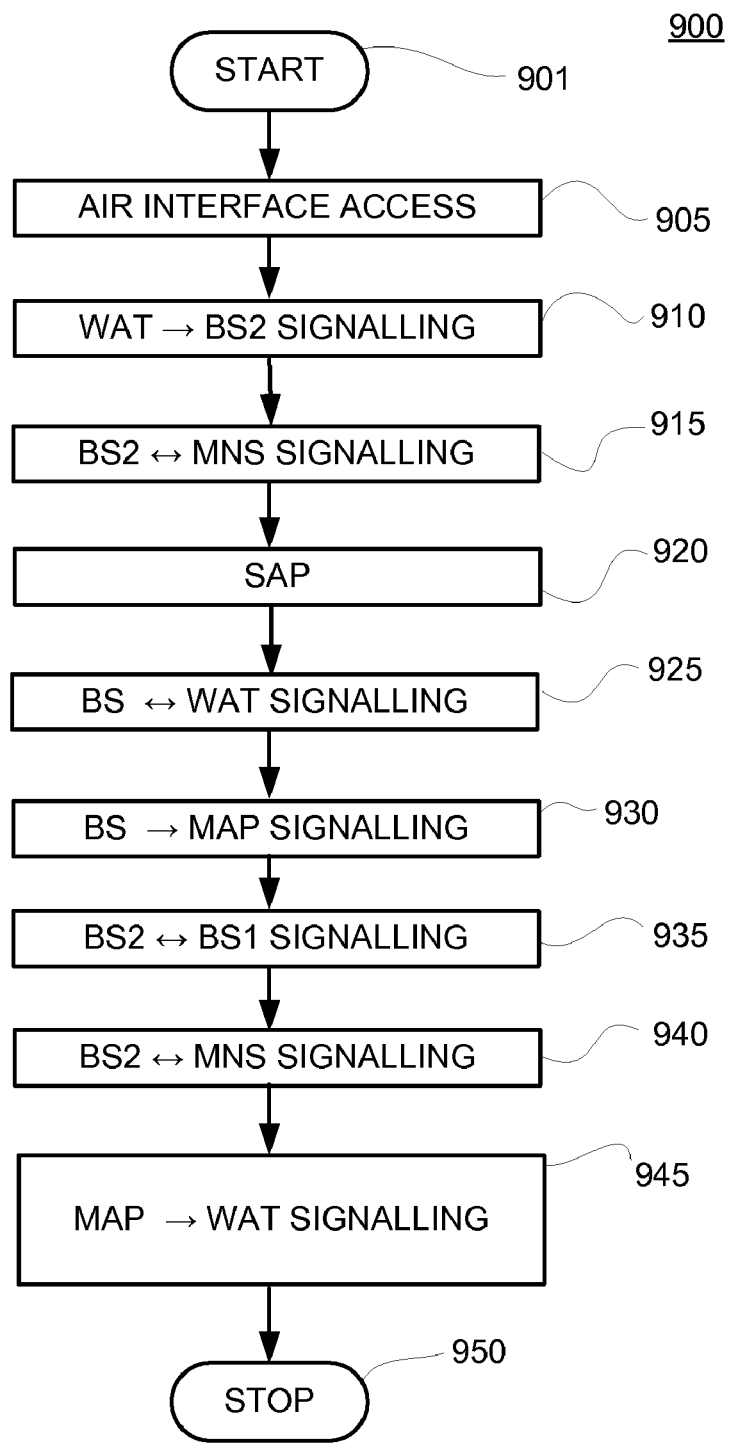
FIG. 9 is a flow chart detailing an exemplary BBM handover process 900, according to an embodiment of the invention.

FIG. 9 is a flow chart detailing an exemplary BBM handover process 900, according to an embodiment of the invention. The exemplary process 900 is initiated 901 and attempts Air Interface Access 905. After Access 905, data/messaging information transfer is initiated from the WT to the BS2 910. Next, an exchange of data/messaging information is performed between the BS2 and MNS 915. Subsequently, SAP 920 is initiated. After successful SAP 920 initiation, an exchange of data/messaging information is performed between BS2 and WT 925. Thereafter, the exemplary process 900 transfers data/messaging information from BS2 to MAP 930. Next, data/messaging information is exchanged between BS2 and BS1 935. The exemplary process 900 then initiates an exchange of data/messaging information between BS2 and MNS 940. Thereafter, the exemplary process 900 begins transfer of data/messaging information from the MAP to the WT 945. After completion of this transfer 945, the exemplary process 900 terminates 950.

Figure 10:
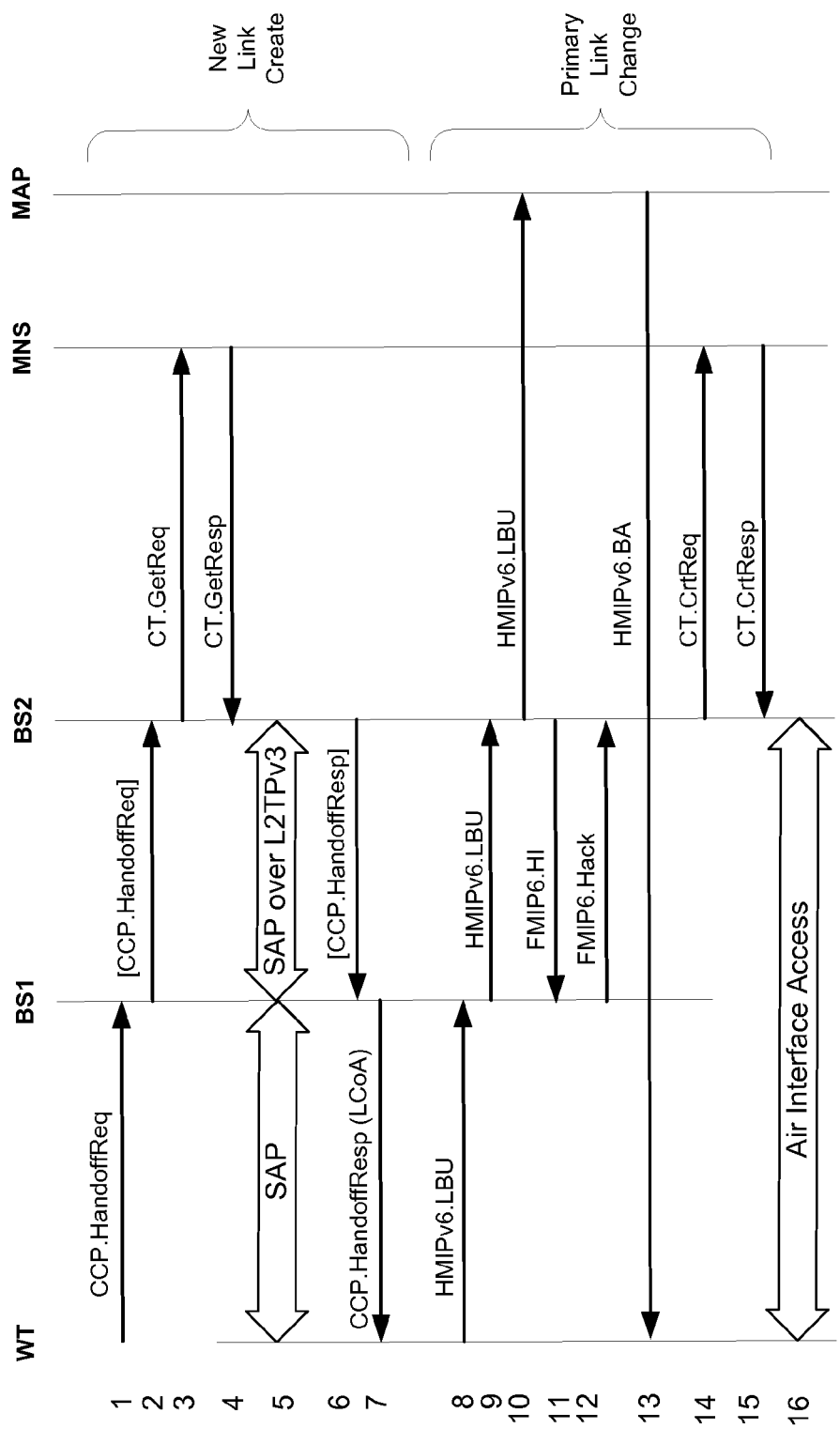
FIG. 10 is an illustration of an exemplary message flow process 1000 for an Expedited Handover, according to an embodiment of this invention.

FIG. 10 is an illustration of an exemplary message flow process 1000 for an Expedited Handover. The exemplary message flows in FIG. 10 illustrate substantially the same sequence of events for expedited handovers. The principal difference in this scenario is that the messages are sent while the WAT is connected to BS1. Despite this, the content of such messages are the same.

Figure 11:
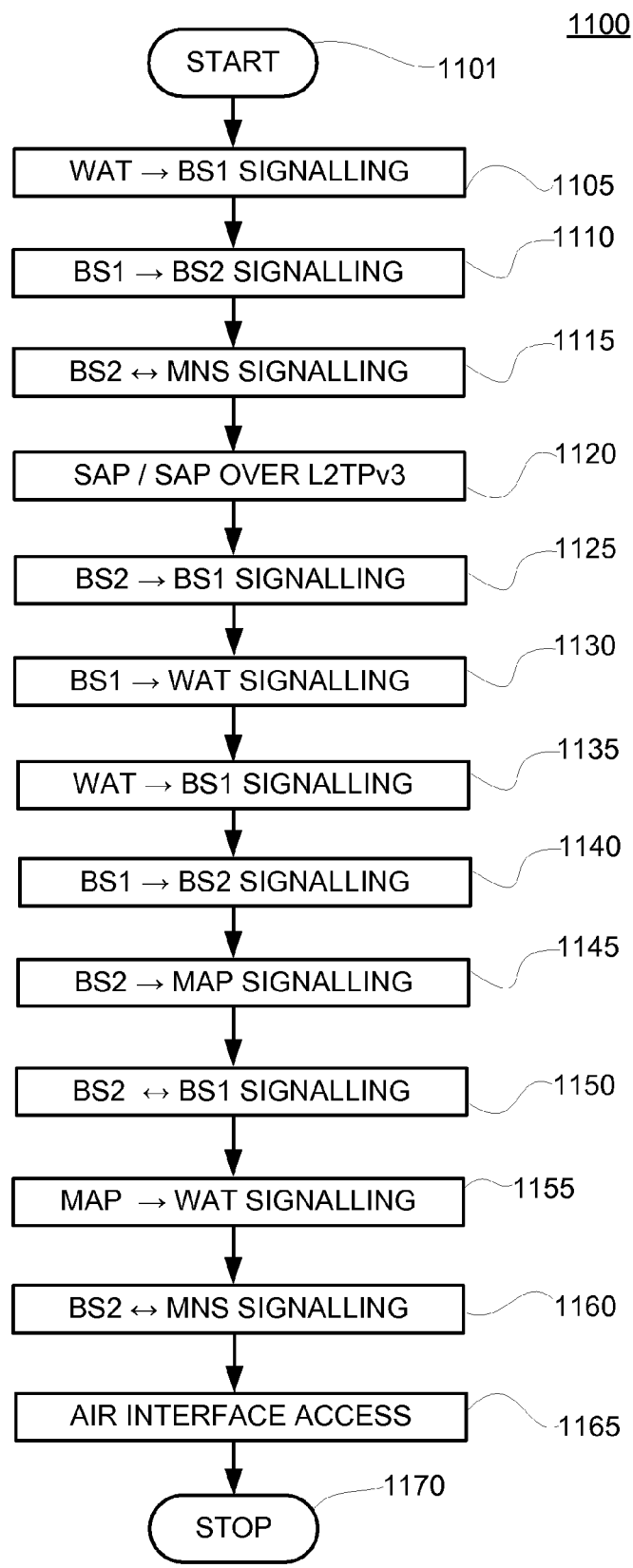
FIG. 11 is a flow chart detailing an exemplary Expedited Handover process 1100, according to an embodiment of this invention.

FIG. 11 is a flow chart detailing an exemplary Expedited Handover process 1100, according to an embodiment of the invention. The exemplary process is initiated 1101, and begins with a transfer of data/messaging information from the WT to BS1 1105. Next, data/messaging information is transferred from BS1 to BS2 1110. After completion of this transfer 1110, data/messaging information is exchanged between BS2 and MNS 1115. Next, SAP and/or SAP over L2TPv3 1120 is started. Following the SAP/L2TPv3 process 1120, data/messaging information is transferred from BS2 to BS1 1125. Next, BS1 data/messaging information is transferred to the WT 1130. The WT, thereafter transfers data/messaging information to BS1 1135. Next, the BS1 transfers data/messaging information to BS2 1140. From there, the BS2 transfers data/messaging information to the MAP 1145. Next, the exemplary process 110 proceeds with exchanging data/messaging information between BS2 and BS1 1150. Subsequently, the exemplary process 1100 transfers data/messaging information from the MAP to the WT 1155. Thereafter, data/messaging information is exchanged between BS2 and MNS 1160. Next, Air Interface Access 1165 is attempted. After this attempt 1165, or the successful completion of this attempt 1165, the exemplary process terminates 1170.

Co-Existence with IPv4

It should be appreciated that, given the presence of IPv4 in the world, compatibility with IPv4 is a necessary concern. Therefore, despite the ability of the exemplary embodiments herein being able to operate in an IPv6 environment, co-existence with IPv4 can be achieved, for example, by using, for example, dual-stacked hosts in the network that can communicate with IPv4 or IPv6 hosts using IPv4 or IPv6, respectively. The DSMIPv6 mechanism can be used to allocate IPv4 addresses and prefixes to the WAT. IPv6 addressing was earlier discussed; and IPv4 addressing has been shown to be implementable based on DHCP. These mechanisms can continue to work in the AAA-based allocation of IPv6/IPv4 addresses. In the DHCP-based scenario, the following modifications may be necessary. For IPv4, there is a slight modification in the current addressing mechanism when DSMIPv6 is used. DSMIPv6 allocates IPv4 addresses and prefixes from the MAP. Since those addresses and prefixes are returned in the BA message, which is sent directly to the WAT, there is a need for a way of informing the BS of such allocation. This can be done in the following manner:

The MAP allocates IPv4 addresses/prefixes based on the DSMIPv6 LBU and returns those addresses in the BA. The IPv4 address may be allocated from a DHCP server based on the NAI included in the LBU. Hence, the MAP acts as a DHCP client for IPv4 addresses.

Upon receiving a DHCP request from the host, the BS sends a DHCP Lease-info message to the DHCP server. This message includes the NAI used by the MAP to allocate the address.

Upon receiving the information from the DHCP server, the BS sends the response to the host, which includes the allocated IPv4 address.

The above example sequence ensures that IPv4 and IPv6 address allocation can be accomplished using DHCP while maintaining consistent knowledge of both addresses in the BS. Therefore, mobile systems, including those that utilize FLASH-OFDM can effectively operate within an IPv4/6 environment.

Figure 12:
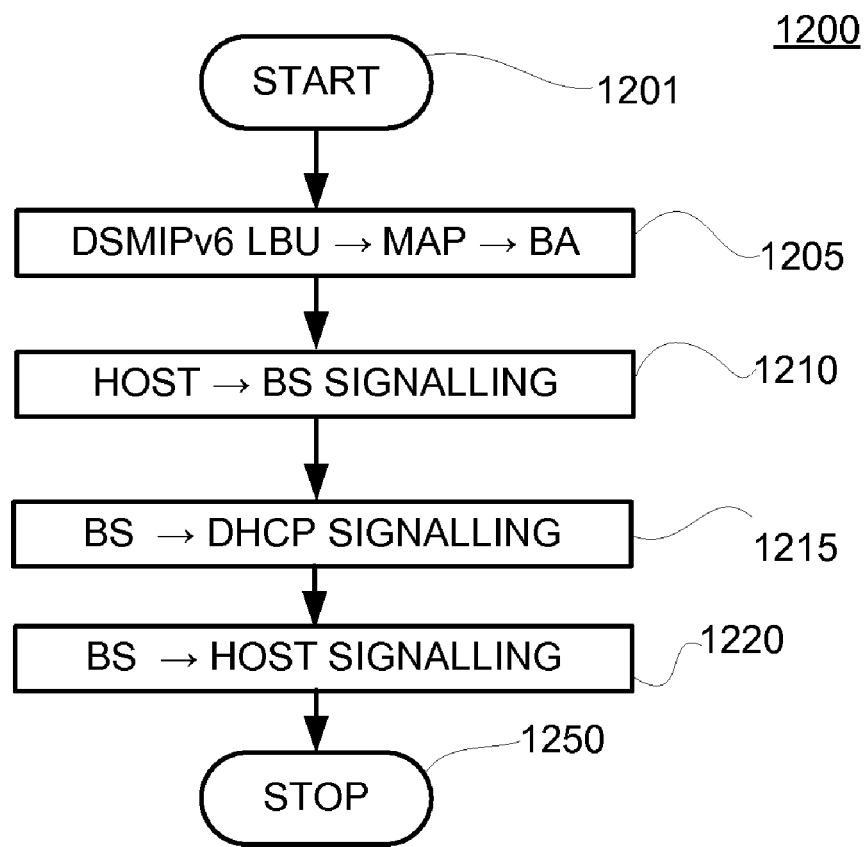
FIG. 12 is a flow chart detailing an exemplary co-existence process 1200, according to an embodiment of this invention.

FIG. 12 is a flow chart detailing an exemplary co-existence process 1200, according to an embodiment of the invention. The exemplary process, from initiation 1201 performs a transfer or allocation of data/messaging information between the DSMIPv6 LB to the MAP and from the MAP to the BA 1205. After this transfer or allocation 1205, data/messaging information is transferred from the host to the BS 1210. Next, data/messaging information is transferred from the BS to the DHCP (server) 1215. Subsequent to this transfer 1215, the BS next transfers data/messaging information to the host 1220. After this successful transfer 1220, the exemplary process 1200 terminates 1225.

Security

Securing the LBU is well described in RFC 4140 and is based on IPsec AH or ESP. These protocols are understood to provide a superior degree of protection as compared to other known existing protocols. The current mechanism in RFC 4140 is understood to rely on IKE for key exchange and SA negotiation. RFC 4140 is also being updated to include IKEv2, which allows for the use of EAP to reuse the AAA infrastructure to bootstrap an IKE SA. This modification will work in an integrated WAT, but may be more difficult from an implementation point of view when it comes to a split WAT. This is due to limitations on what can be implemented in the WAT (i.e., IKE).

An AAA-based mechanism for securing the LBU would appear more appropriate for securing the LBU in the above-described split WAT situation. An AAA-based mechanism would require the generation of a MIP6 application key following a successful two-phase EAP authentication. The MIP6 key would be used by the WAT to secure the LBU. In this scenario, it is understood that IPsec is not suitable because it requires selectors to be present before the LBU is received. While it is possible to "push" the configuration information for the IPsec SA to the MAP from the AAA server, this mechanism is not a standard approach and does not support existing products. Hence, the quickest and most easily deployable method for authenticating the LBU would be to use the authentication option defined in RFC 4285.

Upon receiving the LBU, which includes the WAT's tmp-NAI and the authentication option, the MAP would "pull" the MIP6 key corresponding to the WAT's identity from the MNS (MNS selection is done based on information in the tmpNAI). Following the authentication of the LBU, the MAP sends an authenticated BA using the MIP6 key and the authentication option. This may be implemented in accordance with RFC 4285.

Following the sending of the BA, the MAP installs an SA for the WAT; it is preferred, but not necessary, that the MAP index this SA by the IPv6 RCoA for the lifetime of the SA, as opposed to the tmpNAI. This avoids sending the tmpNAI in all future LBUs. The tmpNAI should only be sent in the first LBU when a new MIP6 application key is being used. Accordingly, AAA-based mechanism for securing the LBU can be achieved for a split WAT situation.

Figure 13:
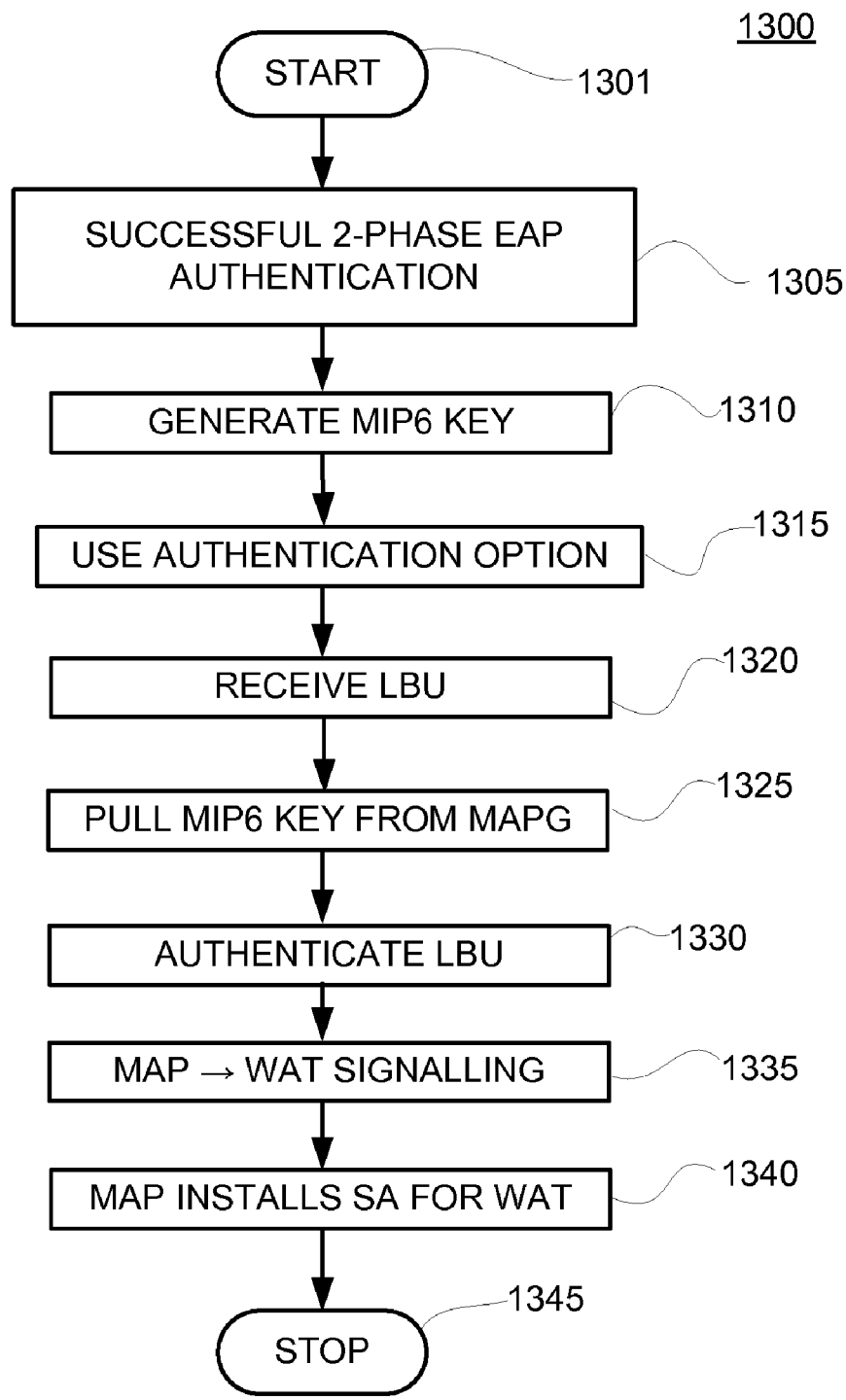
FIG. 13 is a flow chart detailing an exemplary security process 1300, according to an embodiment of this invention.

FIG. 13 is a flow chart detailing an exemplary security process 1300, according to an embodiment of the invention. The exemplary process 1300, upon initiation 1301 attempts EAP authentication 1305. The EAP authentication 1305 may be of the 2-phase authentication, as discussed above. Subsequent to successful EAP authentication 1305, a MIP6 key is generated 1310 by the exemplary process 1300. After generation of the MIP6 key 1310, an authentication option is selected 1315, preferably, but not necessarily one in accordance with RFC 4285. Next, the exemplary process 1300 causes an LBU to be received 1320, which would preferably include at least the WT's tmpNAI and the authentication option 1315. Subsequent to this action 1320, the MIP6 key is pulled from the MAP 1325. Next, the LBU is authenticated 1330 using the selected authentication option 1315. The exemplary process 1300 then proceeds with the transfer of data/messaging information from the MAP to the WT 1335. After this transfer 1335, the exemplary process 1300 engages the MAP to facilitate the installation of the SA for the WT 1340. The exemplary process 1300, then terminates 1345.

Bandwidth Requirements

It is understood that, the LBU message may be sent at the critical handover time and therefore would in some cases be minimized, if possible. The following discussion details the desired size of the message and presents some short and long term optimizations that can be made to reduce the message size. Table 3, below, categorizes the different message sizes for different types of messages, with and without the HAA option:

TABLE 3

Message Sizes

| Message | Size (Bytes) | Size Including HAA option (based on an estimated 16 byte HAA Destination option) |
|---|---|---|
| LBU-basic no sec | 76 | 92 |
| LBU-basic secure | 104 | 120 |
| DSMIPv6 LBU | 112 | 128 |

The LBU-basic message considers the BU as defined in RFC 4140 and the authentication option. The size shown above does not consider the tmpNAI as it is assumed to be sent only in the first message and is therefore not sent in the critical handover time. The DSMIPv6 message size includes the LBU-basic message; in addition, it includes the IPv4 home address option defined in DSMIPv6.

Various immediate and simple example methods for significantly reducing the size of the BU by compressing the header will be presented. As one example, if the header is compressed and the BU is sent on a special stream, a new header can be constructed by the BS without a need for a header compression mechanism. That is, since the MAP's address and the LCoA are already known to the BS, this can be easily achieved. A similar result can be accomplished in the downlink by trapping any message with a mobility header type matching the one allocated to the BU with a source address corresponding to a known MAP. This method could effectively remove the 40 Byte header from the BU, which would reduce it by almost 50%, in many instances. This approach assumes that all the other fields in the IP header are known to the receiver of the message, which may be a valid assumption.

These techniques are adaptable to various modification. The following discussion lists some of the possible changes and their implications to existing protocols.

HMIPv6

HMIPv6 may be updated to include the new HAA option, as defined above, which allows the BU to be sent to the BS and inform it of the previous BS. The HAA option could contain the following information:

A flag (S) that indicates that the receiver of the BU message is the current BS.

A flag (D) that indicates that the receiver is the new BS.

The other BS identifier field. This field would include an identifier of the other BS. The identifier may be an IPv4 or IPv6 address, a link layer identifier that can be mapped to an IP address, or a name for that node that can be resolved to an IP address.

An Action field. This field would describe the purpose of the information in the message and what the receiver is expected to do. An Action indicating, for example, "Do nothing" or a "Null" would be a valid value for this field, which would indicate that the message is for informational purposes. In such a scenario, the message may be used to cause the receiver to manipulate an internal state without have to send messages to other entities in the network.

An optional Message Authentication Code (MAC). This field authenticates the information included in this option. Authentication could be performed, for example, by using a keyed Hash function like HMAC_SHA1 or a similar function. The key used to authenticate this message is the MIP6 application key derived after the successful second phase EAP authentication with the local domain. The same key is used to secure all BU messages.

In addition to the above option, HMIPv6 should support the authentication option in RFC 4285 and the NAI option together with AAA-based authentication.

CCP

The CCP.HandoffResp message may be updated to include the new LCoA. This is a simple option in the message; however, this is understood to increase the message size significantly.

Handling Multiple Links

It should be appreciated that a WAT may be connected to more than one link at a time due to the availability of several links within its vicinity. Those links may be connected to more than one BS. As a result of this, the WAT may direct one set of flows through one link and another set of flows through another link. This is a new feature that requires the WAT to be able to split its traffic to multiple termination points. The following description presents an exemplary solution for handling multiple links in FLASH-OFDM systems. This solution includes the ability to split flows through different BSs, as well as, recovering from secondary link failures.

Flow splitting can only be done once the WAT is connected and authenticated to the new BSs. In other words, the WAT's context typically already exist in all BSs. In this scenario, the WAT has one primary link (where the primary LCoA was configured) and one or more secondary links (links that configured the WAT with an LCoA but the WAT has not registered any of those LCoAs with the MAP). The LCoA configuration is facilitated during the handover process, which ends by allocating a new LCoA to the WAT. If the WAT is connected to several BSs simultaneously, it will be allocated one LCoA from each BS.

The WAT can split flows from the MAP by sending an LBU that includes desired flow information. This will cause the MAP to split flows to different destinations according to the WAT's request.

In one configuration, flow splitting is done from the MAP in the core network instead of a MAP in the BS. This avoids additional backhaul utilization and delays. In some cases flow splitting may happen in the BS, not the MAP in the core network due to a lack of support of such function in the MAP. In this scenario, the BS would include a MAP function that is used for temporarily routing flows to different LCoAs. In this case, contrary to the typical handover sequence, the WAT would not send the LBU to the MAP in the core network after receiving the CCP.HandoffResp message from the new BS. Instead, the WAT would send the LBU message to the old BS, acting as a MAP and request that it splits flows to different destination addresses.

Figure 14:
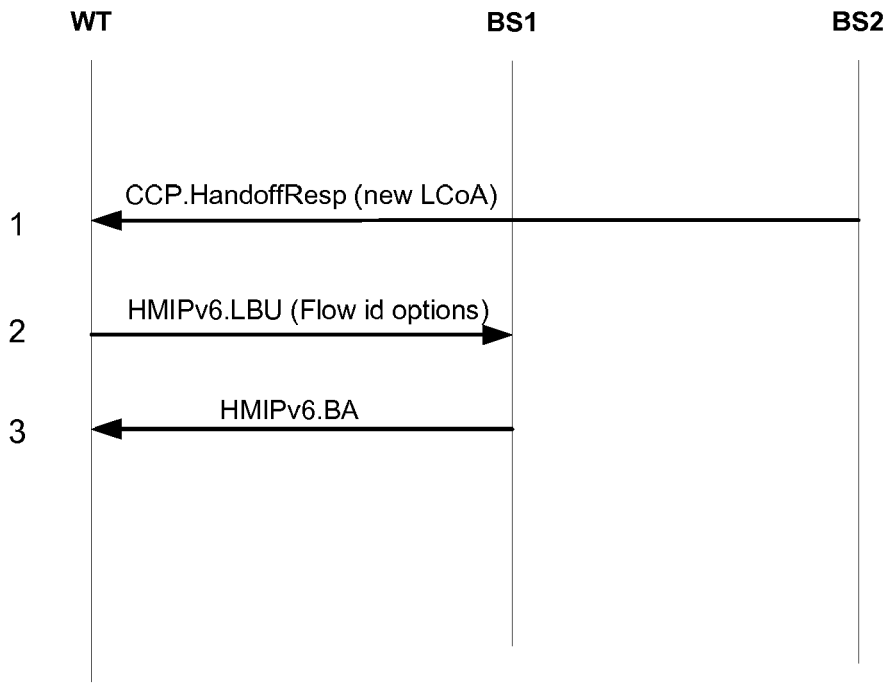
FIG. 14, is a diagram showing exemplary flow bindings using the Primary BS as a MAP, according to an embodiment of this invention.

An exemplary message flow process for the flow splitting approach is shown in FIG. 14, which is a diagram showing Flow bindings using the Primary BS as a MAP. This figure focuses primarily on the flow splitting signaling messages taken out of the handover flow messages shown in the Mobility Management description, as discussed above.

The configuration depicted in FIG. 14 does not distinguish between the different types of handover that might take place. In other words, the same kind of signaling messages take place regardless of whether a MBB, BBM or expedited handover take place. Additional modifications to the above basic sequence would be needed in order to recover from failures of a secondary link. These modifications are discussed in greater detail below.

Failure of a Secondary Link

Due to volatile radio conditions, any radio link can fail without warning. Therefore it is important to gracefully recover from that situation with minimal packet losses. If the Primary link fails, there is no option except for the WAT to select a secondary link and make it a primary link. This may cause some packet losses in some rare scenarios. If a secondary link that forwarded some of the WAT's flows (based on an earlier request in the LBU) failed, the WAT needs to recover from such failure in a quick manner. Two main steps should be taken in order to recover from this situation:

Remove the flow bindings that cause some flows to be forwarded through the failed Secondary link.

Minimise packet losses by having the BS (on the secondary link) forward any packets that already arrived or are en route to it to the Primary BS.

The first step is handled by sending an LBU to the MAP that already contained the WAT's initial flow binding (whether the MAP in the core network or the one in the BS). The LBU would remove any flow bindings that sent flows to the failed link. This mechanism is part of the flow handling.

The second step can be done by making sure that a tunnel is setup between BS controlling the Secondary link and that controlling the Primary link. To establish such tunnel it is critical for all BS' controlling secondary links to be aware of the Primary link. The knowledge of the primary link needs to be persistent, i.e., all Secondary BSs need to know about the primary and need to know about a change in the Primary BS. There are several methods that can achieve this goal. Different alternatives are listed below.

Indicate the Primary BS in the LBU

Figure 15:
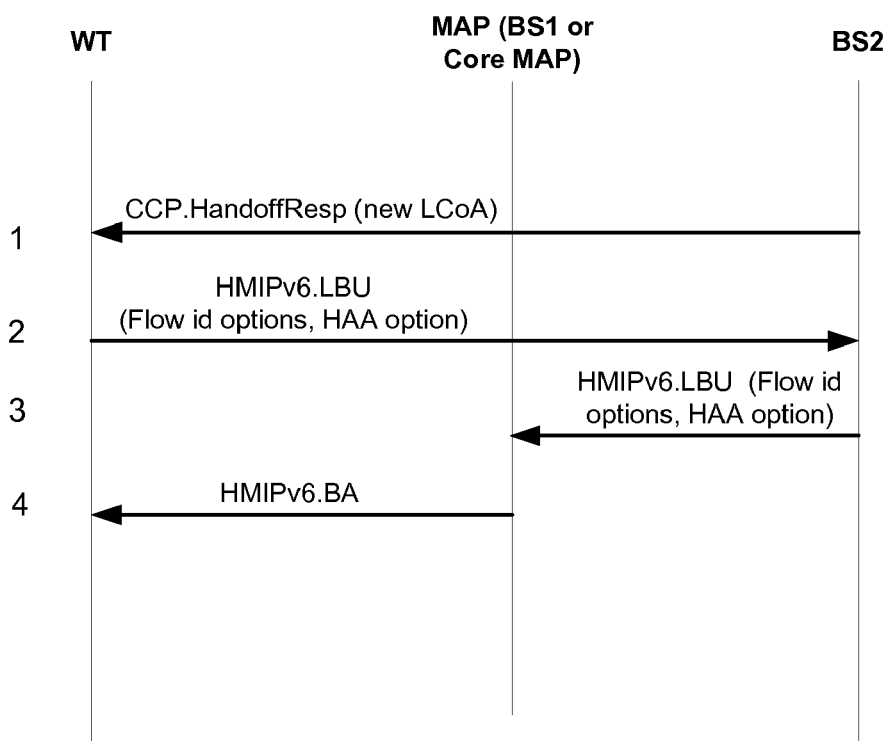
FIG. 15 is a diagram showing an exemplary message flow process in which the Primary BS provides an indication of the LBU, according to an embodiment of this invention.

FIG. 15 is a diagram showing an exemplary message flow process in which the Primary BS provides an indication of the LBU. In this alternative the Primary BS would be indicated in the LBU containing the HAA option described earlier in this document. Since the eventual recipient of the LBU is the MAP (in the core or the Primary BS) the HAA option would still be used. In this scenario the HAA option would contain information that informs the Secondary BS of the Primary BS' address. This is independent of whether the LBU is sent to the MAP in the core network or that in the Primary BS. This mechanism implies that the LBU may be routed to the Secondary BS before its eventual routing to the MAP. This is substantially identical to the LBU sent during handover although the HAA option would contain additional information. Such information is listed below:

An indication that the purpose of the LBU is to route some flows to the new Secondary link and is not a change in the Primary BS. This may be represented with a flag.

An indication of whether the Primary BS's IP address is the one in the Routing header or not. If not, the Primary BS's address may be included in the HAA option.

As a result of this mechanism the Secondary BS would know of the Primary BS' IP address when the LBU is sent. If the Primary BS changed, the Secondary BS would only know it if the WAT decided to route some flows from the Primary BS through the Secondary BS's link. If the WAT does not do that, the Secondary BS would not know of the Primary, however, in this case it doesn't need to know it. Therefore, this exemplary message flow allows a Secondary BS to learn the Primary BS's identity.

If at some point after this message sequence the Secondary link failed, the Secondary BS (BS2 above) would tunnel packets already received at the Secondary link, or ones that are en route to it, to the Primary link. Such tunnel could be setup at the time the link failed, or at any time following the above sequence. Packets could be tunneled in IP, L2TP or any other tunneling protocol.

Using Context Transfer

In addressing the failure of a secondary link, another alternative is described. In this scenario, the WAT's Primary BS is stored in the WAT's context, which is transferred to any other BS during the handover sequence described in this document. The Context may also contain all Secondary BSs. While the WAT is connected to multiple Secondary links, all BSs involved would know the Primary link, as well as, all Secondary links. Hence, if a Secondary link failed, the BS controlling the link would tunnel all packets to the Primary link.

If the Primary link changed, this alternative requires that the WAT updates all Secondary links with a secure CCP message. This can simply indicate the IP address of the new Primary BS, or, alternatively, it can simply indicate a change in the WAT's context, which triggers the receiving BS to get the new context information.

This alternative is more generic than the alternative demonstrated in FIG. 15, as it does not limit the information about a change in the Primary BS to those BSs involved in flow bindings.

Implementation

Figure 16:
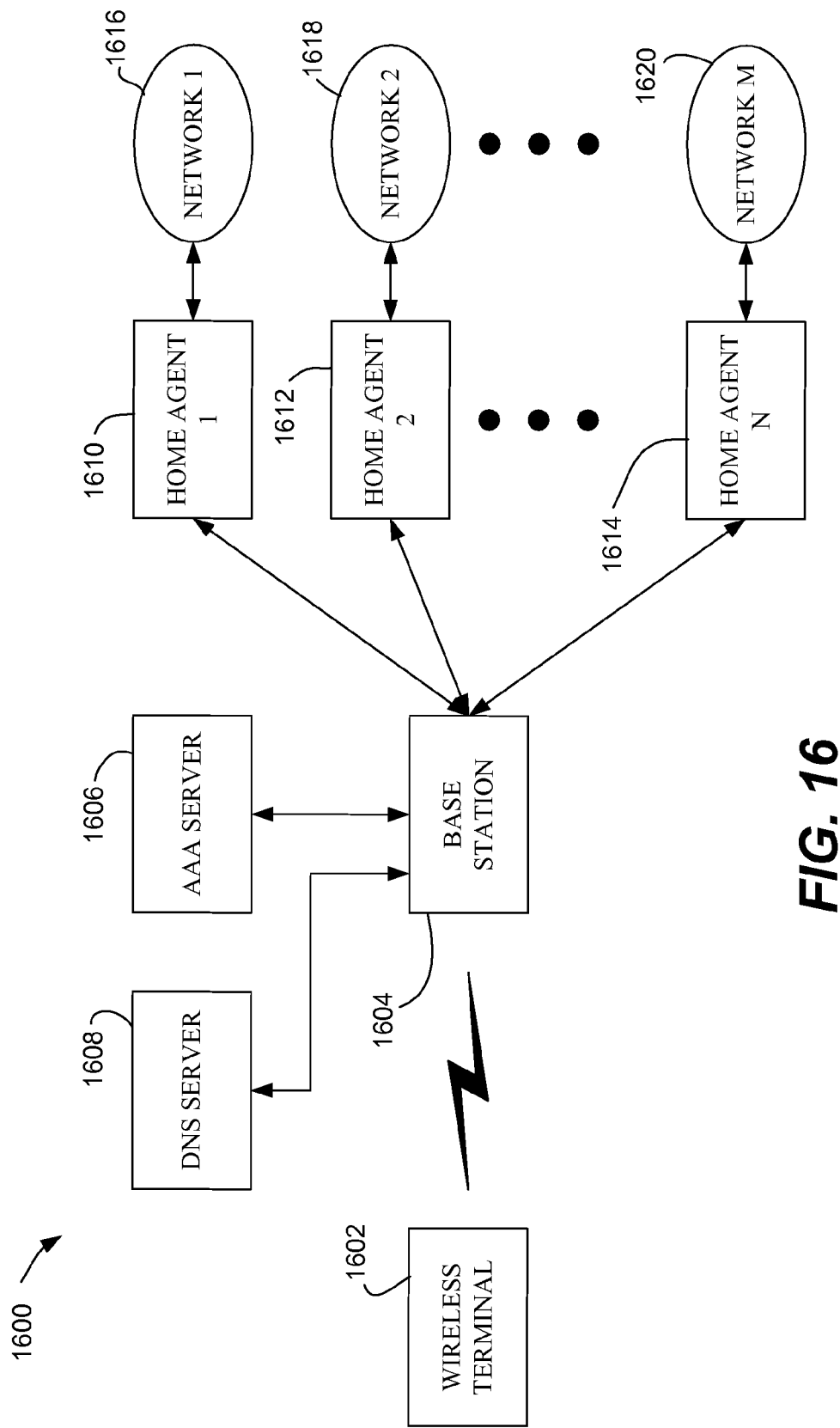
FIG. 16 a diagram showing a communication system 1600, capable of being used with embodiments of this invention.

Referring now to FIG. 16, an example system 1600 is shown. The example system provides a selection of one of several home agents to associate with a wireless terminal in connection with registering the wireless terminal with the home agent; however, it is understood that the features described herein can be implemented in a variety of OFDM systems. In an example, system 1600 can be a cellular-type IP system, such as one that can be utilized in connection with FLASH OFDM. System 1600 includes a wireless terminal 1602, which can be a mobile phone, a PCMCIA card, a memory card, a personal digital assistant, and/or the like. Wireless terminal 1602 can be associated with a base station 1604, such that data can be transmitted over the air between wireless terminal 1602 and base station 1604. To enable such communications, one or more links between wireless terminal 1602 and base station 1604 need to be created and configured, wherein configuration includes providing a host device (not shown) with an IP address, which can be obtained through registering wireless terminal 1602 with respect to a home agent.

In some instances, a subscriber (e.g., an owner/user of wireless terminal 1602) can be provided services by a particular network, such as a Mobile Virtual Network Operator (MVNO), a Virtual Private Network (VPN), or other suitable networks, and thus may be registered with a home agent that is assigned to the particular network. For example, MVNOs typically lease network infrastructure and utilize such infrastructure to provide services to subscribers associated with the MVNO. When wireless terminal 1602 powers on or initially enters a network (e.g., within range of base station 1604), an authentication/authorization/accounting procedure is undertaken prior to enabling wireless terminal 1602 to access services associated with a network. To that end, wireless terminal 1602 can provide identifying indicia to base station 1604, which can in turn relay such indicia to a AAA server 1606. In another example, base station 1604 can resolve a particular identity of a subscriber based upon identifying indicia provided by wireless terminal 1602 and transmit such identity to AAA server 1606. It is understood that any suitable manner for resolving an identity of a subscriber is contemplated by the inventors and intended to fall under the scope of the hereto-appended claims. Identifying indicia provided by wireless terminal can be, for example, a network access identifier (NAI), an International Mobile Subscriber Identity (IMSI), or any other suitable identifying indicia.

Based upon such identifying indicia, AAA server 1606 can determine a home agent from amongst a plurality of home agents to associate with wireless terminal 1602 during registration. In an example, AAA server 1606 can return a home agent address (e.g., IP address) that is specific to a "realm" of the user's NAI (e.g., usernumber@realm.com). In another example, AAA server 1606 can be communicatively coupled to an indexed database and can determine a home agent address based upon review of such index given the identifying indicia. In still another example, base station 1604 can include sufficient intelligence to determine a home agent that is to be assigned to wireless terminal (and an address associated with the home agent).

Still further, a profile associated with wireless terminal 1602 can reside within AAA server 1606, and such profile can include an address of an appropriate home agent or a host name. For instance, AAA server 1606 can return an AAA-home agent host name, and base station 1604 can resolve such host name in a domain name server (DNS) 1608. Additionally, the profile can include a network (e.g., MVNO)—home agent hostname identifier which can be provided to base station 1604, and base station 1604 can resolve such host name to one or more IP addresses by way of local configuration, through DNS 1608, or other suitable database.

System 1600 can include N home agents 1610-1614, where one or more of such home agents 1610-1614 can be associated with a network from amongst a plurality of networks 1616-1620, wherein the networks 1616-1620 can be or include MVNOs, VPNs, and other suitable networks, such that each network can be operated independent from the others (e.g., different administrative domain, reuse of address space . . . ). Thus, multiple home agents can be associated with and/or assigned to a single network. For instance, home agent 1610 can be associated with network 1616, home agent 1612 can be associated with network 1618, home agent 1614 can be associated with network 1620, etc. For example, an association between a home agent and a network can mean that a home agent is directly connected to the network by way of a communication link, such as T1, ATM, Ethernet, etc. Additionally or alternatively, the home agent can be directly connected to the network through utilization of a tunnel established between the home agent and the network (e.g., MPLS, IPinIP, GRE, . . . ).

A home agent can be utilized to perform mobility management with respect to one or more wireless terminals. More particularly, a home agent can be a router that tunnels packets to and from wireless terminal 1602 by way of a current point of attachment (e.g., base station 1604). Based upon identifying indicia provided by wireless terminal 1602 during authentication, authorization, and/or accounting, a home agent address or hostname for one of the home agents 1610-1614 can be identified by AAA server 1606, for example, and provided to base station 1604. During registration of wireless terminal 1602, base station 1604 can indicate that wireless terminal 1602 (or a host associated therewith) should request IP configuration information from the identified home agent. Thus, base station 1604 can build a tunnel (e.g., a Mobile IP tunnel) to the correct home agent.

AAA server 1606 and/or base station 1604 can determine an appropriate home agent to associate with wireless terminal 1602 through a variety of methods/mechanisms. For instance, a subscriber utilizing wireless terminal 1602 may be associated with an MVNO that can be accessed by way of several home agents, and AAA server 1606 can select one of such home agents. For example, the selection can be made based upon geographic location (e.g., a home agent that is geographically most proximate to wireless terminal 1602). In another example, the selection can be made based upon an ordered list, such that if AAA server 1606 associates a first wireless terminal with a first home agent associated with an MVNO then AAA server will associate a second wireless terminal with a second home agent associated with the MVNO. Additionally or alternatively, AAA server 1606 can utilize a weighted list to select a home address with respect to wireless terminal 1606. For instance, if a first home agent is associated with greater resources than a second home agent, it would be more likely that a wireless terminal is assigned to the home agent associated with a greater amount of resources.

A particular example follows to better describe selection of a particular home agent. Wireless terminal 1602 can be associated with a user that subscribes to services provided by network 1616. When wireless terminal 1602 connects to a network, it goes through authentication with AAA server 1606. AAA server 1006 can receive identifying indicia associated with wireless terminal 1602 and can return an address or hostname of home agent 1610 (which is assigned to network 1616) to base station 1604. Base station 1604 thus has knowledge of to which home agent it should set up a tunnel (e.g., using Mobile IP) to connect wireless terminal 1602 to network 1616. For instance, base station 1604 can resolve a hostname to an IP address of home agent 1610 through utilization of DNS 1608.

Figure 17:
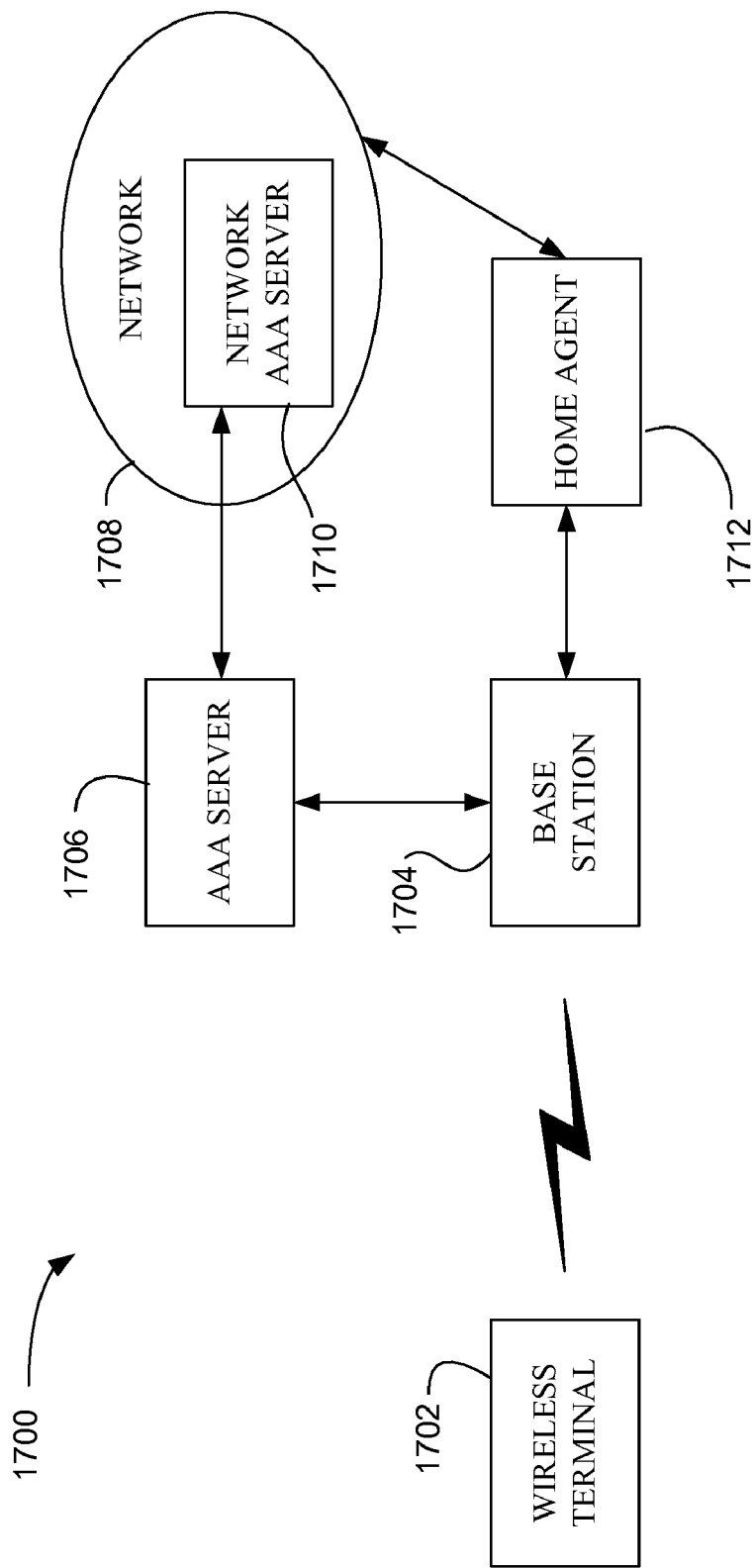
FIG. 17 is a diagram showing a system 1700 using a proxy in connection with determining a home agent to utilize in connection with registering a wireless terminal, capable of being used with embodiments of this invention.

FIG. 17 is a diagram depicting a system 1700 using a proxy in connection with determining a home agent to utilize in connection with registering a wireless terminal. System 1700 includes a wireless terminal 1702 that is entering a network by way of a base station 1704. During authentication, wireless terminal 1702 can provide base station 1704 with identifying indicia, such as an NAI. The NAI can be relayed to an AAA server 1706, which determines a network (e.g., MVNO) 1708 associated with a subscriber utilizing wireless terminal 1702. Such determination can be made through analysis of a realm within the NAI, for instance. The access request can then be provided to a network AAA server 1710 (e.g., a AAA server 1710 that is specific to network 1708). Network AAA server 1710 can then authenticate wireless terminal 1702 and can provide base station 1704 with a specific address or host name for at least one home agent 1712 that is associated with network 1708. The home agent address and/or hostname can be provided to base station 1704 directly or by way of AAA server 1706. If base station 1704 receives a hostname, it can resolve such hostname to an IP address through utilization of a DNS (not shown), for example. Other mechanisms and manners for resolving a hostname to an IP address are contemplated by the inventors and are intended to fall under the scope of the hereto-appended claims. Base station 1704 can build a Mobile IP tunnel to home agent 1712, wherein home agent 1712 can have a preconfigured tunnel to a gateway of network 1708. In another configuration, base station 1704 can allocate a network home agent by resolving a realm of network 1708 to a set of home agents (e.g., by way of DNS, local configuration, and/or other suitable database).

AAA server 1706 can return an address of home agent 1712 to base station 1704 in several different ways. For instance, base station 1704 can be provided with an IP address that can be employed as is. In another example, such address can be in the form of a hostname that can be resolved to one or more IP addresses (for load balancing) by base station 1704. Additionally, realm of network 1708 can be provided to base station 1704, and base station 1704 can automatically construct a host name (e.g., homeagent.mvno) that can be resolved through utilization of a DNS.

Figure 18:
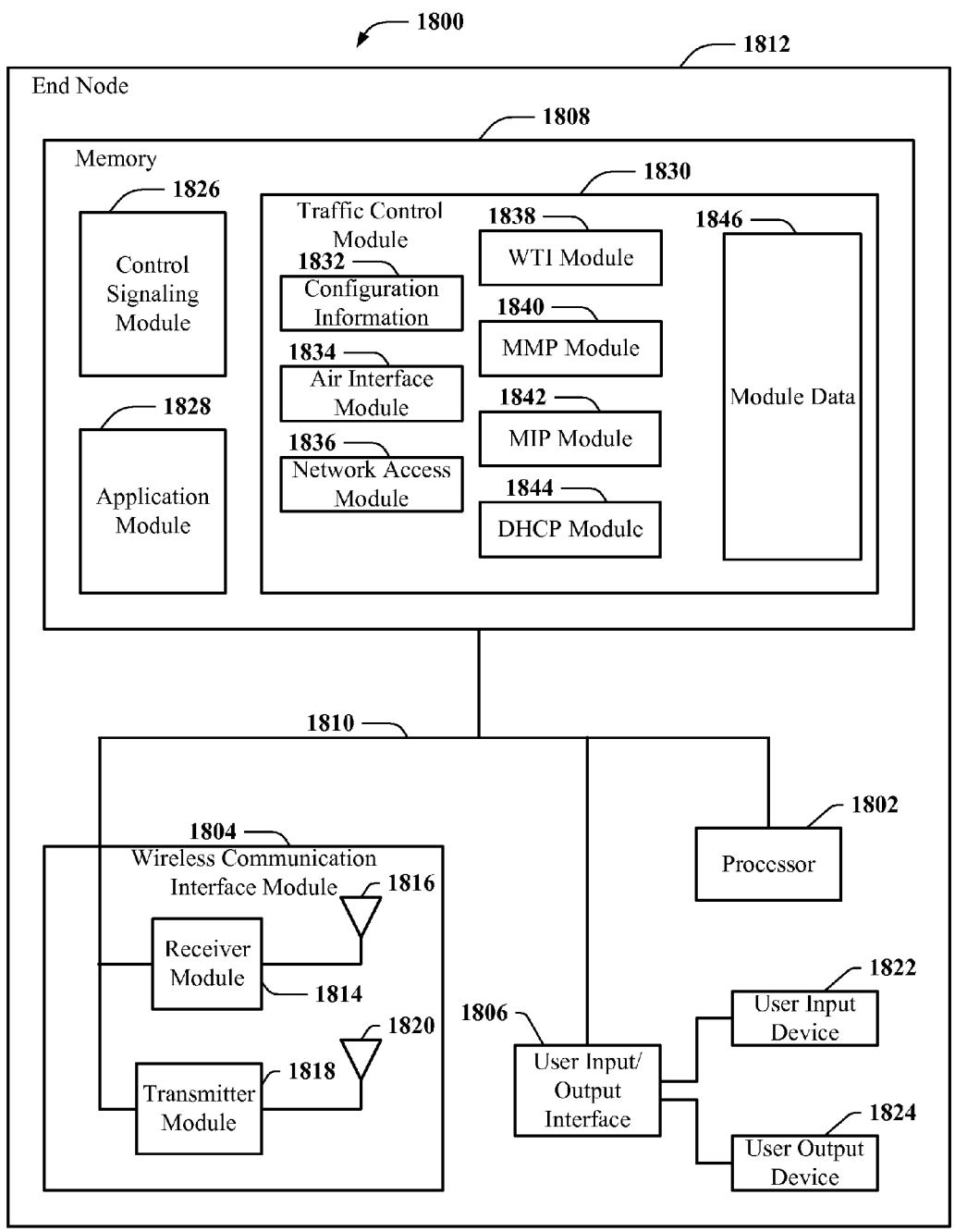
FIG. 18 provides an illustration of an example end node 1800, capable of being used with embodiments of this invention.

FIG. 18 provides an illustration of an example end node 1800, e.g., wireless terminal, host device, or combination thereof. End node 1800 is a representation of an apparatus that may be used as any one of end nodes 1602-1612 (FIG. 16). End node 1800 includes a processor 1802, a wireless communication interface module 1804, a user input/output interface 1806 and memory 1808 coupled together by a bus 1810. Accordingly, by way of bus 1810, the various components of the end node 1800 can exchange information, signals and data. Components 1802-1808 of end node 1800 can be located inside a housing 1812.

Wireless communication interface module 1804 provides a mechanism by which the internal components of end node 1800 can send and receive signals to/from external devices and network nodes, e.g., access nodes. Wireless communication interface module 1804 includes, e.g., a receiver module 1814 with a corresponding receiving antenna 1816 and a transmitter module 1818 with a corresponding transmitting antenna 1820 used for coupling end node 1800 to other network nodes, e.g., by way of wireless communications channels.

End node 1800 also includes a user input device 1822, e.g., keypad, and a user output device 1824, e.g., display, which are coupled to bus 1810 through user input/output interface 1806. Thus, user input/output devices 1822 and 1824 can exchange information, signals and data with other components of end node 1800 by way of user input/output interface 1806 and bus 1810. User input/output interface 1806 and associated devices 1822 and 1824 provide mechanisms by which a user can operate end node 1800 to accomplish various tasks. In particular, user input device 1822 and user output device 1824 provide functionality that allows a user to control end node 1800 and applications, e.g., modules, programs, routines and/or functions, that execute in memory 1808 of end node 1800.

Processor 1802, under control of various modules, e.g., routines, included in memory 1808 controls operation of end node 1800 to perform various signaling and processing. The modules included in memory 1808 are executed on startup or as called by other modules. Modules may exchange data, information, and signals when executed. Modules may also share data and information when executed. Memory 1808 of end node 1800 includes a control signaling module 1826, an application module 1828, and a traffic control module 1830, which further includes configuration information 1832 and various additional modules.

Control signaling module 1826 controls processing relating to receiving and sending signals, e.g., messages, for controlling operation and/or configuration of various aspects of end node 1800 including, e.g., traffic control module 1830 as well as configuration information 1832 and various additional modules. In some configurations, control signaling module 1826 can include state information, e.g., parameters, status and/or other information, relating to operation of end node 1800 and/or one or more signaling protocols supported by control signaling module 1826. In particular, control signaling module 1826 may include configuration information, e.g., end node identification information and/or parameter settings, and operational information, e.g., information about current processing state, status of pending message transactions, etc.

Application module 1828 controls processing and communications relating to one or more applications supported by end node 1800. In some configurations, application module 1828 processing can include tasks relating to input/output of information by way of the user input/output interface 1806, manipulation of information associated with an application, and/or receiving or sending signals, e.g., messages, associated with an application. In some configurations, application module 1828 includes state information, e.g., parameters, status and/or other information, relating to operation of one or more applications supported by application module 1828. In particular, application module 1828 may include configuration information, e.g., user identification information and/or parameter settings, and operational information, e.g., information about current processing state, status of pending responses, etc. Applications supported by application module 1828 include, e.g., Voice over IP (VoIP), web browsing, streaming audio/video, instant messaging, file sharing, gaming, etc.

Traffic control module 1830 controls processing relating to receiving and sending data information, e.g., messages, packets, and/or frames, through wireless communication interface module 1804. The example traffic control module 1830 includes configuration information 1832 as well as various additional modules that enable a home agent to be selected from amongst a plurality of home agents. Various additional modules are included, in some configurations, to perform particular functions and operations as needed to support specific aspects of traffic control. Modules may be omitted and/or combined as needed depending on the functional requirements of traffic control. A description of each additional module included in traffic control module 1830 follows.

An air interface module 1834 facilitates establishing a physical layer connection between end node 1800 and an access node (not shown, such as a base station. Air interface module 1834 can be initiated, for instance, upon end node 1200 receiving power and/or entering a network (e.g., entering a geographic area associated with a network). Configuration information 1832 can include configuration information, e.g., parameters settings, that affect the operation of air interface module 1834.

A network access module 1836 can facilitate request of network access to a AAA server, for example, and receipt of a response relating to network access. For example, network access module 1836 can be employed in connection with providing identifying indicia associated with end node 1800 to a AAA server, such as an NAI. The identifying indicia can be retained within module data 1846, which can be read and/or written to by network access module. Network access module 1836 can also be utilized to receive an address of a home agent that is to be associated with end node 1800 (e.g., a home agent related to an MVNO that provides services to end node 1800).

A WTI module 1838 can be utilized to pass data between a wireless terminal and a host. Such information can be configuration information, such as an IP address assigned to a host (and other suitable configuration information). An MMP module 1840 enables end node 1800 to receive and interpret messages that correspond to an MMP protocol (for example, from a base station). MMP module additionally allows end node 1800 to form and transmit MMP messages, such as configuration request messages, to a base station. An MIP module 1842 provides a manner for end node 1800 to receive, interpret, form, and transmit configuration messages in Mobile IP (e.g., Mobile IPv4 and/or Mobile IPv6). A DHCP module 1844 provides end node 1800 with an ability to act as a DHCP server. For instance, DHCP module 1844 can be configured to respond to a DHCP discover message, provide a host device with configuration information, etc. Module data 1846 can include data that can be extracted by one or modules 1832-1844 or data that is input by one or more modules 1832-1844. For instance, module data 1846 can include network access data, can retain particular addresses (e.g., base station addresses, home agent addresses, . . . ), MMP or Mobile IP data, etc.

Figure 19:
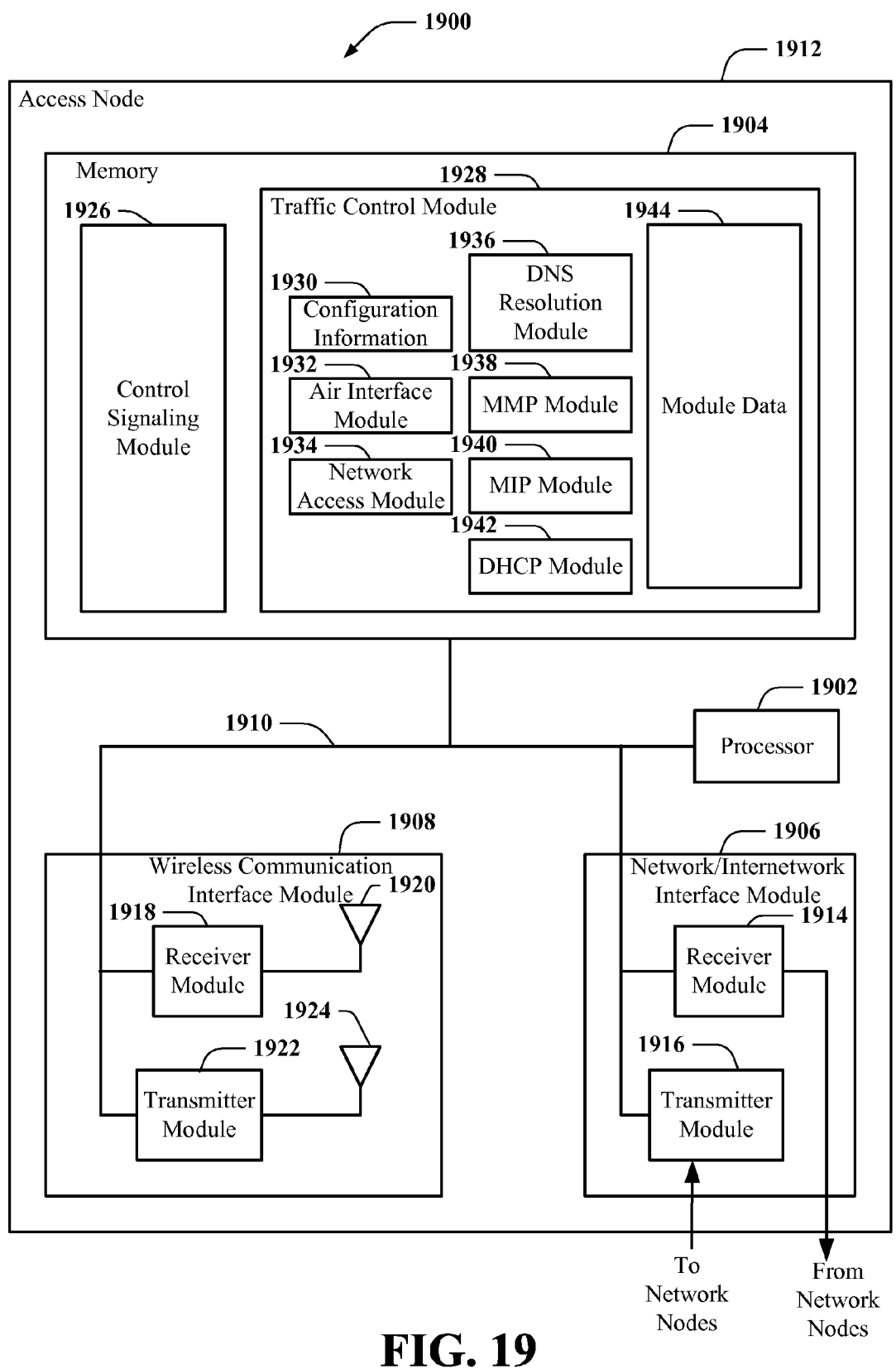
FIG. 19 provides a detailed illustration of an example access node 1900, capable of being used with embodiments of this invention.

FIG. 19 provides a detailed illustration of an example access node 1900. The access node 1900 is a detailed representation of an apparatus that may be used as any one of the access nodes 1614-1618 depicted in FIG. 16. In the FIG. 19 configuration, access node 1900 includes a processor 1902, memory 1904, a network/internetwork interface module 1906 and a wireless communication interface module 1908, coupled together by bus 1910. Accordingly, by way of bus 1910 the various components of access node 1900 can exchange information, signals and data. The components 1902-1910 of access node 1900 are located inside a housing 1912.

Network/internetwork interface module 1906 provides a mechanism by which the internal components of access node 1900 can send and receive signals to/from external devices and network nodes. Network/internetwork interface module 1906 includes a receiver module 1914 and a transmitter module 1916 used for coupling node 1900 to other network nodes, e.g., through copper wires or fiber optic lines. Wireless communication interface module 1908 also provides a mechanism by which the internal components of access node 1900 can send and receive signals to/from external devices and network nodes, e.g., end nodes. Wireless communication interface module 1908 includes, e.g., a receiver module 1918 with a corresponding receiving antenna 1920 and a transmitter module 1922 with a corresponding transmitting antenna 1924. Wireless communication interface module 1908 is used for coupling access node 1900 to other nodes, e.g., by way of wireless communication channels.

Processor 1902 under control of various modules, e.g., routines, included in memory 1904 controls operation of access node 1900 to perform various signaling and processing. The modules included in memory 1904 are executed on startup or as called by other modules. Modules may exchange data, information, and signals when executed. Modules may also share data and information when executed. In the FIG. 19 configuration, memory 1904 of access node 1900 includes a control signaling module 1926 and a traffic control module 1928, which further includes configuration information 1930 and various additional modules 1932-1942.

Control signaling module 1926 controls processing relating to receiving and sending signals, e.g., messages, for controlling operation and/or configuration of various aspects of access node 1900 including, e.g., traffic control module 1928 as well as configuration information 1930 and the various additional modules included therein 1932-1942. For instance, control signaling module 1926 includes state information, e.g., parameters, status and/or other information, relating to operation of access node 1900 and/or one or more signaling protocols supported by control signaling module 1926. In particular, control signaling module 1926 may include configuration information, e.g., access node identification information and/or parameter settings, and operational information, e.g., information about current processing state, status of pending message transactions, etc.

Traffic control module 1928 controls processing relating to receiving and sending data information, e.g., messages, packets, and/or frames, by way of wireless communication interface module 1908. For instance, traffic control module can include configuration information 1930 as well as various additional modules 1932-1942 that are utilized in connection with determining a home agent to associated with an end node. In some configurations, traffic control module 1928 includes state information, e.g., parameters, status and/or other information, relating to operation of access node 1900, traffic control module 1928, and/or one or more of the various additional modules included therein 1932-1942. Configuration information 1930, e.g., parameter settings, determines, affects and/or prescribes operation of traffic control module 1928 and/or the various additional modules included therein 1932-1942. The various additional modules are included, in some configurations, to perform particular functions and operations as needed to support specific aspects of traffic control. In various configurations, modules may be omitted and/or combined as needed depending on the functional requirements of home agent selection. A description of each additional module included in traffic control module 1928 follows.

Air interface module 1932 facilitates establishing a physical layer connection between an end node and access node 1900. Air interface module 1932 can be initiated, for instance, upon access node 1900 receiving an indication that a wireless terminal is within range of access node 1900 and desires access to a network. A network access module 1934 can be employed in connection with authenticating and authorizing an end node (e.g., authenticating identity of an end node and determining type and quality of service that may be provided to the end node). For instance, access node 1900 can act as a conduit between an end node and an AAA server, and network access module 1934 can facilitate packaging and relay of messages that relate to network access.

A DNS resolution module 1936 can be utilized in connection with receiving a hostname and resolving an IP address based at least in part upon the host name. In a particular example, access node 1900 can receive a MVNO-home agent hostname from a AAA server. DNS resolution module 1936 can provide a DNS resolution request to a DNS server and can receive an IP address from such server. DNS resolution module 1936 can thereafter store the IP address within module data 1944, for example.

An MMP module 1938 enables access node 1900 to receive and interpret messages that correspond to an MMP protocol (for example, from a wireless terminal). MMP module additionally allows access node 1900 to form and transmit MMP messages, such as configuration request messages, to an end node. An MIP module 1940 provides a manner for access node 1900 to receive, interpret, form, and transmit configuration messages in Mobile IP (e.g., Mobile IPv4 and/or Mobile IPv6). A DHCP module 1942 provides access node 1900 with an ability to act as a DHCP server. For instance, DHCP module 1942 can be configured to respond to a DHCP discover message, provide a host device with configuration information, etc. Module data 1944 can include data that can be extracted by one or modules 1932-1942 or data that is input by one or more modules 1932-1942. For instance, module data 1942 can include network access data, can retain particular addresses (e.g., base station addresses, home agent addresses, . . . ), MMP or Mobile IP data, etc. Additionally, module data 1342 can retain identifying indicia associated with an end node, a profile, a MVNO-home agent identifier, a home agent address, DHCP data, and the like.

Figure 20:
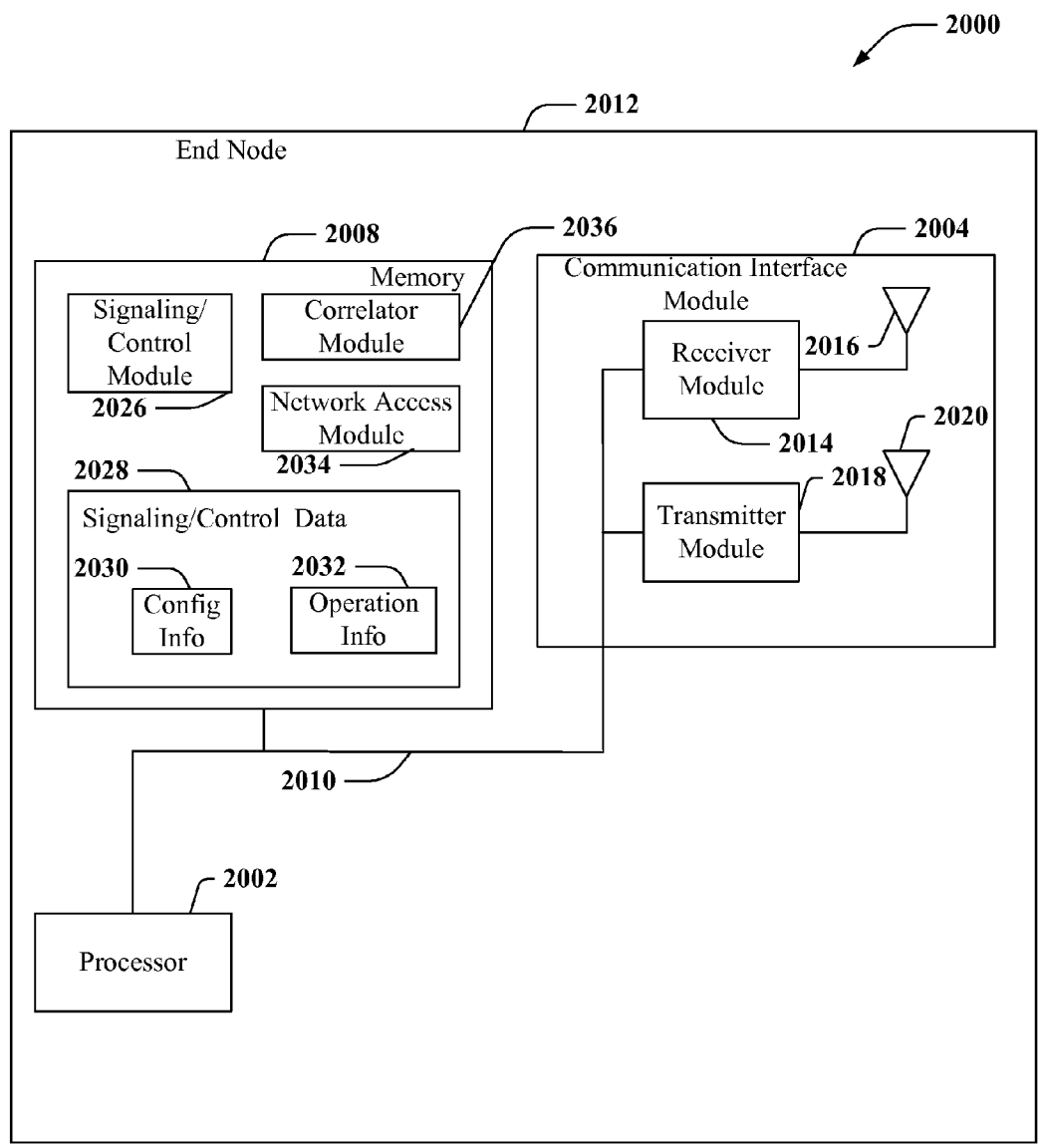
FIG. 20 illustrates an example AAA server 2000 capable of being used with embodiments of this invention.

FIG. 20 illustrates an example AAA server 2000 associated with various aspects. AAA server 2000 can be, for example, an access control node 1626 depicted in FIG. 16. As depicted, AAA server 2000 includes a processor 2002, a communication interface 2004, and memory 2008 coupled together by a bus 2010. Accordingly, various components of AAA server 2000 can exchange information, signals and data by way of bus 2010. Components 2002-2010 of end node 2000 may be located inside a housing 2012.

Communication interface 2004 provides a mechanism by which the internal components of AAA server 2000 can send and receive signals to/from external devices and network nodes (e.g., access nodes). Communication interface 2004 includes, for example, a receiver module 2014 with a corresponding receiving antenna 2016 and a transmitter module 2018 with a corresponding transmitting antenna 2020 used for coupling AAA server 2000 to other network nodes (e.g., by way of any suitable communications channels).

Processor 2002 may be under control of various modules (e.g., routines) included in memory 2008 and may control operation of AAA server 2000 to perform various signaling and processing as described herein. The modules included in memory 2008 can be executed on startup or as called by other modules. Modules may exchange data, information, and signals when executed. Modules may also share data and information when executed. Memory 2008 of AAA Server 2000 may include a signaling/control module 2026 and signaling/control data 2028.

Signaling/control module 2026 controls processing relating to receiving and sending signals (e.g., messages) for management of state information storage, retrieval, and processing. Signaling/control data 2028 includes state information such as, for instance, parameters, status, and/or other information relating to operation of the AAA server. In particular, signaling/control data 2028 may include configuration information 2030 (e.g., AAA server identification information) and operational information 2032 (e.g., information about current processing state, status of pending responses, etc.). Signaling/control module 2026 may access and/or modify signaling/control data 2028 (e.g., update configuration information 2030 and/or operational information 2032).

Memory 2008 can also include a correlator module 2034 which is utilized to correlate a home agent with a wireless terminal based upon identifying indicia associated with a wireless terminal, such as an NAI. For instance, correlator module 2034 can access a database that indexes home agents with particular MVNOs, and correlator module 2034 can determine a particular MVNO based upon the identifying indicia. Thereafter, correlator module 2034 can determine at least one home agent that is assigned to the particular MVNO. Memory 2008 can also include a network access module 2036 that can be utilized to perform authentication with respect to a particular wireless terminal (as well as authorization and accounting).

The various components in FIG. 20, including processor 2002, the components of communication interface 2004 and memory 2008 can be provided as a chipset including one or more monolithic integrated circuit chips.

The techniques described herein may be implemented by various means. For example, these techniques may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. With software, implementation can be through modules (e.g., procedures, functions, and so on) that perform the functions described herein.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for orthogonal frequency division multiplex (OFDM) address allocation in a wireless communication system, the method comprising:
   establishing an air interface with an external host;
   establishing network access with the external host;
   establishing a Hierarchical Mobile IPv6 (HMIPv6) registration, including at least one care-of-address (CoA); and
   sending a message including a handover alert (HAA) option, the HAA option including the following information:
      a flag (S) indicating a receiver of a binding update (BU) message as a current external communication station,
      a flag (D) indicating that the receiver as a new external communication station,
      an other identifier field providing an IP address, capable of mapping to an IP address or providing an identification resolvable to an IP address, and
      an action field describing at least purpose of the information in the message.

2. The method of claim 1, wherein establishing the air interface includes communicating in accordance with a Fast Low-Latency Access with Seamless Handoff Orthogonal Frequency Division Multiplex (FLASH-OFDM) protocol; and
   wherein the registration includes at least one on-link care-of address (LCoA).

3. The method of claim 1, further comprising:
   providing the message authentication code after a successful extended authentication protocol (EAP) authentication with a local domain;
   using the authentication code to secure at least a subset of further BU messages;
   determining a requirement for a dynamic assignment of a home agent and home address in one of a per-session basis and a per-mobile node power-up basis; and
   using a network access identifier (NAI) and a security association with authentication, authorization, and accounting (AAA), the security association created by one of an out-of-band mechanism or IPv6 signaling.

4. A non-transitory machine-readable medium comprising instructions which, when executed by a machine, cause the machine to:
   establish an air interface with an external host;
   establish network access with the external host;
   establish a Hierarchical Mobile IPv6 (HMIPv6) registration, including at least one care-of-address (CoA); and
   send a message including a handover alert (HAA) option, the HAA option including the following information:
      a flag (S) indicating a receiver of a binding update (BU) message as a current external communication station,
      a flag (D) indicating that the receiver as a new external communication station,
      another identifier field providing an IP address, capable of mapping to an IP address or providing an identification resolvable to an IP address, and
      an action field describing at least purpose of the information in the message.

5. A base station for use in a wireless communication system, comprising:
   at least one processor configured to:
      establish an air interface with an external host;
      establish network access with the external host;
      establish a Hierarchical Mobile IPv6 (HMIPv6) registration, including at least one care-of-address (CoA); and
      send a message including a handover alert (HAA) option, the HAA option including the following information:
         a flag (S) indicating a receiver of a binding update (BU) message as a current external communication station,
         a flag (D) indicating that the receiver as a new external communication station,
         an other identifier field providing an IP address, capable of mapping to an IP address or providing an identification resolvable to an IP address, and
         an action field describing at least purpose of the information in the message; and
   memory coupled to said at least one processor.

6. The base station of claim 5, wherein said at least one processor is further configured to:
   provide the message authentication code after a successful extended authentication protocol (EAP) authentication with a local domain;
   use the authentication code to secure at least a subset of further BU messages;
   determine a requirement for a dynamic assignment of a home agent and home address in one of a per-session basis and a per-mobile node power-up basis; and
   use a network access identifier (NAI) and a security association with authentication, authorization, and accounting (AAA), the security association created by one of an out-of-band mechanism or IPv6 signaling.

* * * * *